(12) United States Patent
Hagiopol et al.

(10) Patent No.: US 10,301,777 B2
(45) Date of Patent: *May 28, 2019

(54) WET STRENGTHENED FIBER PRODUCTS, WET STRENGTHENING RESINS, AND METHODS FOR MAKING AND USING SAME

(71) Applicant: ECOLAB USA INC., St. Paul, MN (US)

(72) Inventors: Cornel Hagiopol, Lilburn, GA (US); David F. Townsend, Grayson, GA (US); Clay E. Ringold, Decatur, GA (US); James W. Johnston, Suwanee, GA (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/634,615

(22) Filed: Jun. 27, 2017

(65) Prior Publication Data

US 2017/0292223 A1    Oct. 12, 2017

Related U.S. Application Data

(62) Division of application No. 14/668,097, filed on Mar. 25, 2015, now Pat. No. 9,695,552.

(60) Provisional application No. 61/970,985, filed on Mar. 27, 2014.

(51) Int. Cl.
| | |
|---|---|
| *C08L 77/00* | (2006.01) |
| *D21H 21/20* | (2006.01) |
| *D21H 17/55* | (2006.01) |
| *D21H 17/40* | (2006.01) |
| *C08G 73/02* | (2006.01) |
| *D21H 17/44* | (2006.01) |
| *D21H 17/45* | (2006.01) |
| *C09D 125/08* | (2006.01) |
| *C08L 25/08* | (2006.01) |
| *D21H 17/00* | (2006.01) |

(52) U.S. Cl.
CPC ......... *D21H 21/20* (2013.01); *C08G 73/0286* (2013.01); *C08L 25/08* (2013.01); *C08L 77/00* (2013.01); *C09D 125/08* (2013.01); *D21H 17/40* (2013.01); *D21H 17/44* (2013.01); *D21H 17/45* (2013.01); *D21H 17/455* (2013.01); *D21H 17/55* (2013.01); *D21H 17/72* (2013.01)

(58) Field of Classification Search
None
See application file for complete search history.

(56) References Cited

U.S. PATENT DOCUMENTS

| | | | |
|---|---|---|---|
| 3,096,231 A | 7/1963 | Griggs et al. | |
| 7,897,013 B2 | 3/2011 | Hagiopol et al. | |
| 8,475,630 B2 | 7/2013 | Reis et al. | |
| 8,557,925 B2 | 10/2013 | Hagiopol et al. | |
| 8,999,110 B2 | 4/2015 | Hagiopol et al. | |
| 9,353,483 B2 | 5/2016 | Hagiopol et al. | |
| 2005/0022956 A1* | 2/2005 | Rodriguez | D21H 21/16 162/135 |
| 2006/0037727 A1 | 2/2006 | Hagiopol et al. | |
| 2007/0264896 A1 | 11/2007 | Smith et al. | |
| 2008/0214738 A1 | 9/2008 | Hagiopol et al. | |
| 2009/0165978 A1 | 7/2009 | Hagiopol et al. | |
| 2010/0263818 A1 | 10/2010 | Reis et al. | |
| 2011/0284176 A1 | 11/2011 | Ringold et al. | |
| 2012/0199299 A1 | 8/2012 | Dyer | |
| 2014/0000828 A1 | 1/2014 | Reis et al. | |
| 2014/0166223 A1 | 6/2014 | Hagiopol et al. | |
| 2015/0211182 A1 | 7/2015 | Hagiopol et al. | |
| 2015/0211183 A1 | 7/2015 | Hagiopol et al. | |
| 2015/0259858 A1 | 9/2015 | Ringold et al. | |
| 2015/0259859 A1 | 9/2015 | Ringold et al. | |
| 2015/0275438 A1 | 10/2015 | Hagiopol et al. | |
| 2016/0040011 A1 | 2/2016 | Ringold et al. | |

FOREIGN PATENT DOCUMENTS

| | | |
|---|---|---|
| GB | 865727 | 4/1961 |
| WO | 2015148625 | 10/2015 |
| WO | 2016022879 | 2/2016 |

OTHER PUBLICATIONS

Valton et al, "Performance of Cationic Styrene Maleimide Copolymer in Wet-End Papermaking", TAPPI Journal, vol. 3, No. 4, 2004, pp. 25-30, XP008182244.*
Valton et al., "Performance of Cationic Styrene Maleimide Copolymer in Wet-End Papermaking," 2003 Spring Technical Conference Proceedings, pp. 1-10.
International Search Report and Written Opinion for International Application No. PCT/US2015/022424, dated Jun. 26, 2015.

* cited by examiner

*Primary Examiner* — Ana L. Woodward
(74) *Attorney, Agent, or Firm* — Edmonds & Cmaidalka, P.C.

(57) ABSTRACT

Wet strengthened fiber products, wet strengthening resins, and methods for making such wet strengthened fiber products and wet strengthening resins. The wet strengthened fiber product can include a fiber web and an at least partially cured wet strengthening resin, which prior to at least partially curing, the wet strengthening resin can include a polyamide-epihalohydrin (PAE) resin and a cationic styrene maleimide (SMI) resin. The PAE resin can include a reaction product of a polyamidoamine and an epihalohydrin and the cationic SMI resin can include a reaction product of a styrene maleic anhydride (SMA) copolymer and an amine. The wet strengthened fiber product can include the wet strengthening resin in an amount of about 0.05 wt % to about 5 wt %, based on a dried weight of the wet strengthened fiber product.

20 Claims, No Drawings

WET STRENGTHENED FIBER PRODUCTS, WET STRENGTHENING RESINS, AND METHODS FOR MAKING AND USING SAME

CROSS-REFERENCE TO RELATED APPLICATIONS

This application is a divisional of co-pending patent application Ser. No. 14/668,097, filed on Mar. 25, 2015, which claims priority to U.S. Provisional Patent Application No. 61/970,985, filed on Mar. 27, 2014, which are both incorporated by reference herein.

BACKGROUND

Field

Embodiments described generally relate to paper or fiber products and wet strengthening agents for use in paper or fiber products. More particularly, such embodiments relate to wet strengthened paper or fiber products and wet strengthening resins that can include a polyamide-epihalohydrin (PAE) resin and a cationic styrene maleimide (SMI) resin.

Description of the Related Art

Paper is sheet material containing interconnected small, discrete fibers. The fibers are usually formed into a sheet on a fine screen from a dilute water suspension or slurry. Typically paper is made from cellulosic fibers, although occasionally synthetic fibers are used. The wet strength of paper is generally considered to be the resistance of the paper to rupture when wetted with water. Paper products made from untreated cellulose fibers generally lose their strength rapidly when they become wet, hence, they can be considered to have low wet strength. Generally, the wet strength of paper is only about 5% of the dry strength for the same type of paper. Various methods for treating paper products have been employed to overcome this disadvantage.

Wet strengthening agents can be added to the cellulose fibers of paper. There are many wet strengthening agents that have specific reactive groups capable of reacting with cellulosic fibers. Once the wet strengthening agent and cellulose fibers are combined, a curing mechanism provides a reinforcement of the inter-fibers hydrogen bonds and/or a protection against water penetration at the crossing points of the fibers. The strengthening effect of the wet strengthening agent usually depends on the cationic charge density, polymer molecular weight, specific hydrophilic-hydrophobic properties, and the reactivity of the wet strengthening agent.

Wet strengthening agents applied to paper are either of the "permanent" or "temporary" type, which are defined by how long the paper retains its wet strength after immersion in water. While wet strength retention is a desirable property in packaging materials, it presents a disposal problem because paper products having such properties generally require undesirably severe conditions to degrade. While some wet strengthening agents are known to impart temporary wet strength and thus would be suitable for sanitary or disposable paper uses, they often suffer from one or more drawbacks. For example, some wet strengthening agents generally have a low magnitude of wet strength (about one-half of the level achievable for permanent-type wet strengthening agents), are easily attacked by mold and slime, and/or can only be prepared as dilute solutions.

There is a need, therefore, for improved wet strengthened fiber products, wet strengthening resins, and methods for making the wet strengthened fiber products and the wet strengthening resins.

SUMMARY

Wet strengthened fiber products, wet strengthening resins, and methods for making such wet strengthened fiber products and wet strengthening resins are provided. A wet strengthened fiber product can include a fiber web and an at least partially cured wet strengthening resin. The at least partially cured wet strengthening resin, prior to at least partially curing, can include a polyamide-epihalohydrin (PAE) resin that can include a reaction product of a polyamidoamine and an epihalohydrin, and a cationic styrene maleimide (SMI) resin that can include a reaction product of a styrene maleic anhydride copolymer and an amine compound. The cationic SMI resin can have a weight average molecular weight of about 500 to about 200,000 and a styrene to maleimide molar ratio of about 1:1 to about 5:1. The PAE resin can be present in the wet strengthening resin in an amount of about 5 wt % to about 95 wt % and the cationic SMI resin can be present in the wet strengthening resin in an amount of about 5 wt % to about 95 wt %, based on the combined weight of the PAE resin and the cationic SMI resin. The wet strengthening resin can be present in the wet strengthened fiber product in an amount of about 0.05 wt % to about 5 wt %, based on a combined weight of the PAE resin and the cationic SMI resin relative to a dried weight of the wet strengthened fiber product.

In some examples, the wet strengthening resin can be or include an uncured wet strengthening resin, a cured wet strengthening resin, or a mixture thereof. The wet strengthening resin can include a PAE resin that can be or include the reaction product of one or more polyamidoamines and one or more epihalohydrins. The PAE resin can be present in the wet strengthening resin in an amount of about 50 wt % to about 95 wt %, based on the combined weight of the PAE resin and the cationic SMI resin. The wet strengthening resin can also include a cationic SMI resin that can be or include the reaction product of a styrene maleic anhydride copolymer and one or more amine compounds. The cationic SMI resin can be present in the wet strengthening resin in an amount of about 5 wt % to about 50 wt %, based on the combined weight of the PAE resin and the cationic SMI resin, and can have a weight average molecular weight of about 500 to about 200,000 and a styrene to maleimide molar ratio of about 1:1 to about 5:1.

The wet strengthened fibers or paper products can be formed, made, or otherwise produced by various methods. The wet strengthening resin can be combined with a plurality of fibers to produce a fiber mixture that can be formed into fiber sheets. Alternatively, the fibers, at least one PAE resin, and at least one cationic SMI resin can be combined to form or produce the fiber mixture. The PAE resin and the cationic SMI resin in the fiber sheets can be at least partially cured to form or make the wet strengthened fiber product. In some examples, the PAE resin can be combined with or added to the aqueous suspension containing fibers, then the cationic SMI resin can be combined with or added to the aqueous suspension to form the fiber mixture (e.g., cellulosic fiber mixture) containing the fibers, the PAE resin, and the cationic SMI resin. In other examples, the cationic SMI resin can be combined with or added to the aqueous suspension containing fibers, then the PAE resin can be combined with or added to the aqueous suspension to form the fiber mixture containing the fibers, the PAE resin, and the cationic SMI resin. In other examples, the cationic SMI resin and the PAE resin can be combined to form a mixture of wet strengthening resins, then at least fibers can be combined with the mixture of wet strengthening resins to form the fiber mixture containing the fibers, the PAE resin, and the cationic SMI resin.

DETAILED DESCRIPTION

It has been surprisingly and unexpectedly discovered that blending one or more polyamide-epihalohydrin (PAE) resins and one or more cationic styrene maleimide (SMI) resins provides a wet strengthening resin with improved performance properties when mixed, blended, or otherwise contacted with fibers (e.g., cellulosic fibers). The wet strengthening resin surprisingly and unexpectedly enhances the wet strength of paper and paper products. Surprisingly, the blends of the PAE resin and the cationic SMI resin provide a synergistic effect as a wet strengthening agent for paper. Without wishing to be bound by theory, it is believed that the PAE resin can provide formation of new covalent bonds on the fibers and the cationic SMI resin can provide protection of the existing hydrogen bonds by increasing the hydrophobicity of the fibers.

A wet strengthened fiber or paper product can include a fiber web (e.g., cellulosic fiber web) and an at least partially cured wet strengthening resin, which prior to at least partially curing, the wet strengthening resin can include a PAE resin and a cationic SMI resin. The PAE resin can generally include a reaction product of a polyamidoamine and an epihalohydrin. The PAE resin can be present in the wet strengthening resin in an amount of about 5 wt % to about 95 wt % or about 10 wt % to about 90 wt %, based on the combined weight of the PAE resin and the cationic SMI resin. The cationic SMI resin can generally include a reaction product of a styrene maleic anhydride (SMA) copolymer and an amine compound. In some examples, the cationic SMI resin can have a weight average molecular weight of about 500 to about 200,000 and can have a styrene to maleimide molar ratio of about 1:1 to about 5:1. The cationic SMI resin can be present in the wet strengthening resin in an amount of about 5 wt % to about 95 wt % or about 10 wt % to about 90 wt %, based on the combined weight of the PAE resin and the cationic SMI resin. In some examples, the wet strengthening resin can be present in the wet strengthened fiber product in an amount of about 0.05 wt % to about 5 wt %, based on a combined weight of the PAE resin and the cationic SMI resin relative to a dried weight of the wet strengthened fiber product.

An at least partially cured, wet strengthening resin is provided. Prior to curing, the wet strengthening resin can include a PAE resin and a cationic SMI resin. The PAE resin can generally include the reaction product of a polyamidoamine and an epihalohydrin and can be present in the wet strengthening resin in an amount of about 50 wt % to about 95 wt %, based on the combined weight of the PAE resin and the cationic SMI resin. The cationic SMI resin can generally include the reaction product of a SMA copolymer and an amine compound and can be present in the wet strengthening resin in an amount of about 5 wt % to about 50 wt %, based on the combined weight of the PAE resin and the cationic SMI resin. The cationic SMI resin can have a weight average molecular weight of about 500 to about 200,000, e.g., about 2,000 to about 80,000, and can have a styrene to maleimide molar ratio of about 1:1 to about 5:1, e.g., about 1:1 to about 3:1. The cationic SMI resin can be present in the wet strengthening resin in an amount of about 8 wt % to about 40 wt % and the PAE resin can be present in the wet strengthening resin in an amount of about 60 wt % to about 92 wt %, based on the combined weight of the PAE resin and the cationic SMI resin.

The PAE resin can be present in the wet strengthening resin in an amount of about 5 wt %, about 8 wt %, about 10 wt %, about 12 wt %, about 15 wt %, about 20 wt %, about 22 wt %, about 25 wt %, about 28 wt %, about 30 wt %, or about 35 wt % to about 38 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or greater. In other examples, the PAE resin can be present in the wet strengthening resin in an amount of about 20 wt %, about 30 wt %, about 40 wt %, about 50 wt %, or about 60 wt % to about 65 wt %, about 70 wt %, about 75 wt %, about 80 wt %, about 85 wt %, about 90 wt %, about 95 wt %, or greater. For example, the PAE resin can be present in the wet strengthening resin in an amount of about 5 wt % to about 95 wt %, about 5 wt % to about 90 wt %, about 5 wt % to about 70 wt %, about 5 wt % to about 50 wt %, about 10 wt % to about 95 wt %, about 10 wt % to about 90 wt %, about 10 wt % to about 85 wt %, about 10 wt % to about 80 wt %, about 10 wt % to about 75 wt %, about 10 wt % to about 70 wt %, about 10 wt % to about 60 wt %, about 10 wt % to about 50 wt %, about 10 wt % to about 40 wt %, about 10 wt % to about 30 wt %, about 10 wt % to about 25 wt %, about 10 wt % to about 20 wt %, about 30 wt % to about 95 wt %, about 30 wt % to about 90 wt %, about 30 wt % to about 85 wt %, about 30 wt % to about 80 wt %, about 30 wt % to about 75 wt %, about 30 wt % to about 70 wt %, about 30 wt % to about 60 wt %, about 30 wt % to about 50 wt %, about 50 wt % to about 95 wt %, about 50 wt % to about 90 wt %, about 50 wt % to about 85 wt %, about 50 wt % to about 80 wt %, about 50 wt % to about 75 wt %, about 50 wt % to about 70 wt %, about 50 wt % to about 60 wt %, about 65 wt % to about 95 wt %, about 65 wt % to about 90 wt %, about 65 wt % to about 85 wt %, about 65 wt % to about 80 wt %, or about 65 wt % to about 75 wt %, based on the combined weight of the PAE resin and the cationic SMI resin. In some specific examples, the PAE resin can be present in the wet strengthening resin in an amount of about 5 wt % to about 95 wt %, about 10 wt % to about 90 wt %, about 33 wt % to about 92 wt %, about 50 wt % to about 90 wt %, about 60 wt % to about 92 wt %, about 60 wt % to about 88 wt %, or about 67 wt % to about 86 wt %, based on the combined weight of the PAE resin and the cationic SMI resin.

The cationic SMI resin can be present in the wet strengthening resin in an amount of about 5 wt %, about 8 wt %, about 10 wt %, about 11 wt %, about 12 wt %, about 13 wt %, or about 15 wt % to about 20 wt %, about 22 wt %, about 25 wt %, about 28 wt %, about 30 wt %, about 35 wt %, about 40 wt %, about 50 wt %, about 60 wt %, about 70 wt %, about 80 wt %, about 90 wt %, about 95 wt %, or greater. For example, the cationic SMI resin can be present in the wet strengthening resin in an amount of about 5 wt % to about 95 wt %, about 5 wt % to about 90 wt %, about 5 wt % to about 70 wt %, about 5 wt % to about 50 wt %, about 8 wt % to about 20 wt %, about 8 wt % to about 30 wt %, about 8 wt % to about 40 wt %, about 8 wt % to about 50 wt %, about 8 wt % to about 90 wt %, about 10 wt % to about 95 wt %, about 10 wt % to about 90 wt %, about 10 wt % to about 50 wt %, about 10 wt % to about 40 wt %, about 10 wt % to about 30 wt %, about 10 wt % to about 25 wt %, about 10 wt % to about 20 wt %, about 10 wt % to about 15 wt %, about 15 wt % to about 90 wt %, about 15 wt % to about 95 wt %, about 15 wt % to about 50 wt %, about 15 wt % to about 40 wt %, about 15 wt % to about 30 wt %, about 15 wt % to about 25 wt %, or about 15 wt % to about 20 wt %, based on the combined weight of the PAE resin and the cationic SMI resin. In some specific examples, the cationic SMI resin can be present in the wet strengthening resin in an amount of about 5 wt % to about 95 wt %, about 10 wt % to about 90 wt %, about 10 wt % to about 50 wt %, about 8 wt % to about 40 wt %, about 11 wt % to about 33 wt %, about 12 wt % to about 20 wt %, or about 13 wt % to about 18 wt %, based on the combined weight of the PAE resin and the cationic SMI resin.

The wet strengthening resin can be present in the wet strengthened fiber or paper product in an amount of about 0.05 wt %, about 0.07 wt %, about 0.1 wt %, about 0.2 wt %, about 0.3 wt %, about 0.4 wt %, or about 0.5 wt % to about 0.6 wt %, about 0.7 wt %, about 0.8 wt %, about 0.9 wt %, about 1 wt %, about 1.1 wt %, about 1.2 wt %, about 1.4 wt %, about 1.5 wt %, about 1.6 wt %, about 1.8 wt %, about 2 wt %, about 2.5 wt %, about 3 wt %, about 3.5 wt %, about 4 wt %, about 4.5 wt %, about 5 wt %, about 5.5 wt %, about 6 wt %, about 7 wt %, about 8 wt %, about 9 wt %, about 10 wt %, or greater, based on a combined weight of the PAE resin and the cationic SMI resin relative to a dried weight of the wet strengthened fiber product. For example, about 0.05 wt % to about 10 wt %, about 0.05 wt % to about 7 wt %, about 0.05 wt % to about 5 wt %, about 0.05 wt % to about 4 wt %, about 0.05 wt % to about 3 wt %, about 0.05 wt % to about 2.5 wt %, about 0.05 wt % to about 2 wt %, about 0.05 wt % to about 1.5 wt %, about 0.05 wt % to about 1 wt %, about 0.05 wt % to about 0.5 wt %, about 0.1 wt % to about 10 wt %, about 0.1 wt % to about 7 wt %, about 0.1 wt % to about 5 wt %, about 0.1 wt % to about 4 wt %, about 0.1 wt % to about 3 wt %, about 0.1 wt % to about 2.5 wt %, about 0.1 wt % to about 2 wt %, about 0.1 wt % to about 1.5 wt %, about 0.1 wt % to about 1 wt %, about 0.1 wt % to about 0.5 wt %, about 0.5 wt % to about 10 wt %, about 0.5 wt % to about 7 wt %, about 0.5 wt % to about 5 wt %, about 0.5 wt % to about 4 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 0.5 wt % to about 0.8 wt %, about 1 wt % to about 5 wt %, about 1 wt % to about 4 wt %, about 1 wt % to about 3 wt %, about 1 wt % to about 2.5 wt %, about 1 wt % to about 2 wt %, or about 1 wt % to about 1.5 wt %, based on a combined weight of the PAE resin and the cationic SMI resin relative to a dried weight of the wet strengthened fiber product. In some specific examples, the wet strengthening resin can be present in the wet strengthened fiber or paper product in an amount of about 0.05 wt % to about 5 wt %, about 0.1 wt % to about 2 wt %, about 0.2 wt % to about 1.8 wt %, about 0.4 wt % to about 0.6 wt %, about 0.5 wt % to about 0.8 wt %, about 0.6 wt % to about 0.8 wt %, or about 0.3 wt % to about 1.2 wt %, based on a combined weight of the PAE resin and the cationic SMI resin relative to a dried weight of the wet strengthened fiber product.

The wet strengthening resin and the wet strengthened fiber product can independently have a PAE resin to the cationic SMI resin weight ratio ("PAE/SMI weight ratio") of about 0.1, about 0.2, about 0.3, about 0.4, about 0.5, about 0.6, about 0.8, or about 1 to about 1.5, about 2, about 3, about 4, about 5, about 6, about 8, about 10, about 12, about 15, about 18, about 20, about 22, about 24, about 28, or greater. For example, the wet strengthening resin and the wet strengthened fiber product can independently have a PAE/SMI weight ratio of about 0.1 to about 24, about 0.1 to about 20, about 0.1 to about 15, about 0.1 to about 12, about 0.1 to about 10, about 0.1 to about 8, about 0.1 to about 5, about 0.1 to about 4, about 0.1 to about 2, about 0.1 to about 1, about 0.2 to about 24, about 0.2 to about 20, about 0.2 to about 15, about 0.2 to about 12, about 0.2 to about 10, about 0.2 to about 8, about 0.2 to about 5, about 0.2 to about 4, about 0.2 to about 2, about 0.2 to about 1, about 0.5 to about 24, about 0.5 to about 20, about 0.5 to about 15, about 0.5 to about 12, about 0.5 to about 10, about 0.5 to about 8, about 0.5 to about 5, about 0.5 to about 4, about 0.5 to about 2, about 0.5 to about 1, about 1 to about 24, about 1 to about 20, about 1 to about 15, about 1 to about 12, about 1 to about 10, about 1 to about 8, about 1 to about 5, about 1 to about 4, or about 1 to about 2. In some specific examples, the wet strengthening resin and the wet strengthened fiber product can independently have a PAE/SMI weight ratio of about 0.2 to about 24, about 0.2 to about 19, about 0.5 to about 11.5, about 0.5 to about 5, or about 1 to about 5.

The wet strengthening resin can be present in 907.2 kg of the dried wet strengthened fiber product, once dried and cured, in an amount of about 0.8 kg, about 0.9 kg, about 1 kg, about 1.5 kg, about 2 kg, about 2.5 kg, or about 3 kg to about 3.5 kg, about 4 kg, about 4.5 kg, about 5 kg, about 6 kg, about 8 kg, about 10 kg, about 12 kg, about 15 kg, about 18 kg, about 20 kg, about 22 kg, about 25 kg, or greater. For example, the wet strengthening resin can be present in 907.2 kg of the dried wet strengthened fiber product, once dried and cured, in an amount of about 0.8 kg to about 25 kg, about 0.9 kg to about 22 kg, about 1 kg to about 22 kg, about 2 kg to about 20 kg, about 5 kg to about 18 kg, about 5 kg to about 15 kg, about 5 kg to about 12 kg, about 5 kg to about 10 kg, about 8 kg to about 18 kg, about 8 kg to about 15 kg, about 8 kg to about 12 kg, or about 8 kg to about 10 kg. In some specific examples, the wet strengthening resin can be present in 907.2 kg of the dried wet strengthened fiber product, once dried and cured, in an amount of about 0.91 kg to about 22.7 kg, about 1.81 kg to about 16.3 kg, about 2.72 kg to about 10.9 kg, about 3.63 kg to about 7.26 kg, or about 5.44 kg to about 6.45 kg.

In some examples, the PAE resin can be present in 907.2 kg of the dried wet strengthened fiber product, once dried and cured, in an amount of about 0.5 kg, about 0.6 kg, about 0.8 kg, about 0.9 kg, about 1 kg, about 1.5 kg, about 2 kg, about 2.5 kg, or about 3 kg to about 3.5 kg, about 4 kg, about 4.5 kg, about 5 kg, about 6 kg, about 8 kg, about 10 kg, about 12 kg, about 15 kg, about 18 kg, about 20 kg, about 22 kg or greater. For example, the PAE resin can be present in 907.2 kg of the dried wet strengthened fiber product, once dried and cured, in an amount of about 0.5 kg to about 22 kg, about 0.8 kg to about 22 kg, about 1 kg to about 20 kg, about 2 kg to about 20 kg, about 3 kg to about 18 kg, about 3 kg to about 15 kg, about 3 kg to about 12 kg, about 3 kg to about 10 kg, about 5 kg to about 18 kg, about 5 kg to about 15 kg, about 5 kg to about 12 kg, about 5 kg to about 10 kg, about 8 kg to about 18 kg, about 8 kg to about 15 kg, or about 8 kg to about 12 kg. In some specific examples, the PAE resin can be present in 907.2 kg of the dried wet strengthened fiber product, once dried and cured, in an amount of about 0.91 kg to about 18.1 kg, about 1.81 kg to about 13.6 kg, about 2.72 kg to about 9.07 kg, about 3.63 kg to about 5.44 kg, or about 4.54 kg to about 5.25 kg.

In other examples, the cationic SMI resin can be present in 907.2 kg of the dried wet strengthened fiber product, once dried and cured, in an amount of about 0.1 kg, about 0.2 kg, about 0.3 kg, about 0.4 kg, about 0.5 kg, about 0.6 kg, about 0.8 kg, or about 1 kg to about 1.2 kg, about 1.5 kg, about 2 kg, about 2.5 kg, about 3 kg to about 3.5 kg, about 4 kg, about 4.5 kg, about 5 kg, about 5.5 kg, about 6 kg, about 8 kg, about 10 kg, about 12 kg, or greater. For example, the cationic SMI resin can be present in 907.2 kg of the dried wet strengthened fiber product, once dried and cured, in an amount of about 0.1 kg to about 12 kg, about 0.2 kg to about 12 kg, about 0.5 kg to about 12 kg, about 1 kg to about 12 kg, about 0.2 kg to about 10 kg, about 0.5 kg to about 10 kg, about 1 kg to about 10 kg, about 2 kg to about 10 kg, about 3 kg to about 10 kg, about 5 kg to about 10 kg, about 1 kg to about 8 kg, about 2 kg to about 8 kg, about 3 kg to about 8 kg, about 5 kg to about 8 kg, about 1 kg to about 6 kg, about 2 kg to about 6 kg, about 3 kg to about 6 kg, about 5 kg to about 6 kg, about 3 kg to about 18 kg, about 3 kg to about 15 kg, about 3 kg to about 12 kg, about 3 kg to about 10 kg, about 5 kg to about 18 kg, about 5 kg to about 15 kg, about 5 kg to about 12 kg, about 5 kg to about 10 kg, about 8 kg to about 18 kg, about 8 kg to about 15 kg, or about 8 kg to about 12 kg. In some specific examples, the cationic SMI resin can be present in 907.2 kg of the dried wet strengthened fiber product, once dried and cured, in an amount of about 0.23 kg to about 9.07 kg, about 0.36 kg to about 4.54 kg, about 0.45 kg to about 2.27 kg, about 0.68 kg to about 1.36 kg, or about 0.91 kg to about 1.23 kg.

The wet strengthened fiber product can generally have a basis weight of about 30 g/m$^2$, about 35 g/m$^2$, about 40 g/m$^2$, about 45 g/m$^2$, about 50 g/m$^2$, about 55 g/m$^2$, about 60 g/m$^2$, or about 65 g/m$^2$ to about 70 g/m$^2$, about 75 g/m$^2$, about 80 g/m$^2$, about 85 g/m$^2$, about 80 g/m$^2$, about 95 g/m$^2$, about 100 g/m$^2$, about 105 g/m$^2$, about 110 g/m$^2$, about 115 g/m$^2$, about 120 g/m$^2$, about 125 g/m$^2$, about 130 g/m$^2$, or greater. For example, the wet strengthened fiber product can have a basis weight of about 30 g/m$^2$ to about 120 g/m$^2$, about 30 g/m$^2$ to about 110 g/m$^2$, about 30 g/m$^2$ to about 100 g/m$^2$, about 30 g/m$^2$ to about 90 g/m$^2$, about 30 g/m$^2$ to about 70 g/m$^2$, about 30 g/m$^2$ to about 50 g/m$^2$, about 50 g/m$^2$ to about 120 g/m$^2$, about 50 g/m$^2$ to about 110 g/m$^2$, about 50 g/m$^2$ to about 100 g/m$^2$, about 50 g/m$^2$ to about 90 g/m$^2$, or about 50 g/m$^2$ to about 70 g/m$^2$. In some specific examples, the wet strengthened fiber product can have a basis weight of about 40.7 g/m$^2$ to about 122.1 g/m$^2$, about 48.9 g/m$^2$ to about 97.7 g/m$^2$, about 57 g/m$^2$ to about 81.4 g/m$^2$, about 65.1 g/m$^2$ to about 73.3 g/m$^2$, or about 68.4 g/m$^2$ to about 69.8 g/m$^2$.

The wet strengthened fiber product containing the wet strengthening resin that includes the PAE resin and the cationic SMI resin has significantly improved dry tensile strength over using either the PAE resin or the cationic SMI resin alone, without the other, as a wet strengthening agent. The wet strengthened fiber product containing the wet strengthening resin can have a dry tensile strength of about 75 J/m, about 80 J/m, about 85 J/m, about 90 J/m, about 95 J/m, or about 100 J/m to about 105 J/m, about 110 J/m, about 115 J/m, about 120 J/m, about 125 J/m, about 130 J/m, about 135 J/m, about 140 J/m, about 145 J/m, about 150 J/m, or greater. For examples, the wet strengthened fiber product containing the wet strengthening resin can have a dry tensile strength of about 75 J/m to about 150 J/m, about 75 J/m to about 140 J/m, about 75 J/m to about 130 J/m, about 75 J/m to about 120 J/m, about 75 J/m to about 110 J/m, about 90 J/m to about 150 J/m, about 90 J/m to about 140 J/m, about 90 J/m to about 130 J/m, about 90 J/m to about 120 J/m, about 90 J/m to about 110 J/m, about 100 J/m to about 150 J/m, about 100 J/m to about 140 J/m, about 100 J/m to about 130 J/m, about 100 J/m to about 120 J/m, about 100 J/m to about 110 J/m, or about 110 J/m to about 120 J/m. In some specific examples, the wet strengthened fiber product containing the wet strengthening resin can have a dry tensile strength of about 89 J/m to about 133.4 J/m, about 89 J/m to about 124.6 J/m, about 89 J/m to about 124.1 J/m, about 89 J/m to about 120.5 J/m, about 89 J/m to about 117 J/m, about 89 J/m to about 113.9 J/m, about 89 J/m to about 109.4 J/m, about 89 J/m to about 99.6 J/m, about 89 J/m to about 98.8 J/m, or about 89 J/m to about 97.9 J/m.

The wet strengthened fiber product containing the wet strengthening resin that includes the PAE resin and the cationic SMI resin has significantly improved wet tensile strength over using either the PAE resin or the cationic SMI resin alone, without the other, as a wet strengthening agent. The wet strengthened fiber product can have a wet tensile strength of about 2 J/m, about 3 J/m, about 4 J/m, about 5 J/m, about 6 J/m, or about 8 J/m to about 10 J/m, about 12 J/m, about 15 J/m, about 18 J/m, about 20 J/m, about 25 J/m, about 30 J/m, about 35 J/m, about 40 J/m, about 45 J/m, about 50 J/m, or greater. For example, the wet strengthened fiber product can have a wet tensile strength of about 2 J/m to about 50 J/m, about 2 J/m to about 40 J/m, about 2 J/m to about 35 J/m, about 2 J/m to about 30 J/m, about 2 J/m to about 25 J/m, about 2 J/m to about 20 J/m, about 2 J/m to about 15 J/m, about 2 J/m to about 10 J/m, about 5 J/m to about 40 J/m, about 5 J/m to about 35 J/m, about 5 J/m to about 30 J/m, about 5 J/m to about 25 J/m, about 5 J/m to about 20 J/m, about 5 J/m to about 15 J/m, about 5 J/m to about 10 J/m, about 10 J/m to about 40 J/m, about 10 J/m to about 35 J/m, about 10 J/m to about 30 J/m, about 10 J/m to about 25 J/m, about 10 J/m to about 20 J/m, or about 10 J/m to about 15 J/m. In some specific examples, the wet strengthened fiber product can have a wet tensile strength of about 4.4 J/m to about 35.6 J/m, about 4.4 J/m to about 26.7 J/m, about 4.4 J/m to about 24.9 J/m, about 4.4 J/m to about 24.5 J/m, about 4.4 J/m to about 23.1 J/m, about 4.4 J/m to about 21.4 J/m, about 4.4 J/m to about 19.6 J/m, about 4.4 J/m to about 16.5 J/m, about 4.4 J/m to about 12 J/m, about 4.4 J/m to about 7.1 J/m, or about 4.4 J/m to about 6.7 J/m.

The wet strengthened fiber product can have a wet-to-dry (W/D) tensile strength ratio of about 5, about 6, about 7, about 8, about 9, or about 10 to about 11, about 12, about 13, about 14, about 15, about 16, about 17, about 18, about 19, about 20, about 22, about 24, about 26, about 28, about 30, or greater. For example, the wet strengthened fiber product can have a wet-to-dry (W/D) tensile strength ratio of about 5 to about 30, about 7 to about 30, about 10 to about 30, about 5 to about 25, about 7 to about 25, about 10 to about 25, about 5 to about 20, about 7 to about 20, about 10 to about 20, about 12 to about 20, about 14 to about 20, about 16 to about 20, or about 18 to about 20. In some specific examples, the wet strengthened fiber product can have a wet-to-dry (W/D) tensile strength ratio of about 12 to about 22, about 12 to about 20, about 12 to about 16, or about 12 to about 14.

In other specific examples, the wet strengthened fiber product can have an increasing W/D tensile strength ratio value as the PAE resin to the cationic SMI resin (PAE/SMI) weight ratio value increases. For example, the wet strengthened fiber product can have a W/D tensile strength ratio of about 12.01 with a PAE/SMI ratio of about 0.2; a W/D tensile strength ratio of about 13.93 with a PAE/SMI ratio of about 0.5; a W/D tensile strength ratio of about 16.07 with a PAE/SMI ratio of about 1; a W/D tensile strength ratio of about 19.53 with a PAE/SMI ratio of about 2; and a W/D tensile strength ratio of about 21.92 with a PAE/SMI ratio of about 5.

In some examples, the cationic SMI resin of the wet strengthening resin can have the chemical formula (A):

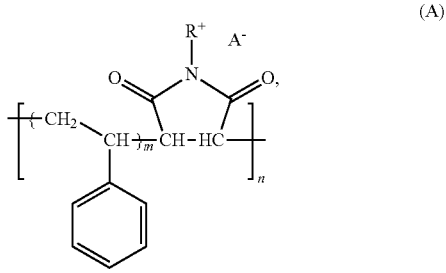

(A)

where "$R^+$" can be a cationic molecular group, "$A^-$" can be an anion, "m" can be an integer of 1 to about 20 for the number of styrene monomer units, and "n" can be an integer of about 5 to about 5,000 for the number of cationic SMI monomer units. In various examples, the cationic molecular group $R^+$ can be a cationic nitrogen-containing group, such as a cationic ammonium group, or a cationic phosphorous-containing group, such as a cationic phosphonium group, or any mixture thereof.

In some examples, the cationic molecular group $R^+$ can be a cationic nitrogen-containing group bonded to the nitrogen of the imide by a substituted or unsubstituted organic diyl group (e.g., $C_1$-$C_{12}$), and which can include primary, secondary, tertiary, quaternary nitrogen compounds, such as ammonium compounds, amine compounds, aniline compounds, and other nitrogen-containing compounds. The cationic nitrogen-containing group can include —($C_1$-$C_{12}$)$NX_{(3-y)}H_y^+$, where "—($C_1$-$C_{12}$)" can be a substituted or unsubstituted organic diyl group, "y" can be equal to 0, 1, 2, or 3, and each X can be independently a substituted or unsubstituted linear, branched, saturated, unsaturated, cyclic, heterocyclic, or aromatic hydrocarbon, such as methyl, ethyl, propyl, butyl, pentyl, phenyl, isomers thereof, or derivatives thereof. In many examples, the substituted or unsubstituted organic diyl group "—($C_1$-$C_{12}$)" can be methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), linear, branched, saturated, unsaturated, isomers thereof, halide-substituted derivatives thereof, or any mixture thereof. The substituted organic diyl group "—($C_1$-$C_{12}$)" can be propanediyl, and the maleimide portion of the cationic SMI resin can be an aminopropylamine maleimide. Exemplary cationic nitrogen-containing groups, such as cationic ammonium groups, can include, but are not limited to, —($C_1$-$C_{12}$)$[NH_3]^+$, —($C_1$-$C_{12}$)$[NH_2(CH_3)]^+$, —($C_1$-$C_{12}$)$[NH(CH_3)_2]^+$, —($C_1$-$C_{12}$)$[N(CH_3)_3]^+$, —($C_1$-$C_{12}$)$[NH_2(CH_2CH_3)]^+$, —($C_1$-$C_{12}$)$[NH(CH_2CH_3)_2]^+$, —($C_1$-$C_{12}$)$[N(CH_2CH_3)_3]^+$, or other alkyl derivatives.

In other examples, the cationic molecular group $R^+$ can be a cationic phosphorus-containing group bonded to the nitrogen of the imide by a substituted or unsubstituted organic diyl group (e.g., $C_1$-$C_{12}$), and which can include primary, secondary, tertiary, quaternary nitrogen compounds, such as phosphonium compounds. The cationic phosphorus-containing group can include —($C_1$-$C_{12}$)$PX_{(3-y)}H_y^+$, where "—($C_1$-$C_{12}$)" can be a substituted or unsubstituted organic diyl group, "y" can be equal to 0, 1, 2, or 3, and each X can be independently a substituted or unsubstituted linear, branched, cyclic, heterocyclic, or aromatic hydrocarbon, such as methyl, ethyl, propyl, butyl, pentyl, phenyl, linear, branched, saturated, unsaturated, isomers thereof, or derivatives thereof. The substituted or unsubstituted organic diyl group "—($C_1$-$C_{12}$)" of the cationic phosphorus-containing groups can be any of the chemical groups as in the cationic nitrogen-containing groups. The substituted organic diyl group "—($C_1$-$C_{12}$)" can be propanediyl, and the maleimide portion of the cationic SMI resin can be a phosphonium propyl maleimide. Exemplary cationic phosphorus-containing groups, such as cationic phosphonium groups, can include, but are not limited to, —($C_1$-$C_{12}$)$[PH_3]^+$, —($C_1$-$C_{12}$)$[PH_2(CH_3)]^+$, —($C_1$-$C_{12}$)$[PH(CH_3)_2]^+$, —($C_1$-$C_{12}$)$[P(CH_3)_3]^+$, —($C_1$-$C_{12}$)$[PH_2(CH_2CH_3)]^+$, —($C_1$-$C_{12}$)$[PH(CH_2CH_3)_2]^+$, —($C_1$-$C_{12}$)$[P(CH_2CH_3)_3]^+$, or other alkyl derivatives.

In some examples, the anion $A^-$ can be a carboxylate (e.g., $[RCO_2]^-$), a halide (e.g., $F^-$, $Cl^-$, $Br^-$, $I^-$), a hydroxide (e.g., $[OH]^-$), a chlorate anion (e.g., $ClO^-$, $[ClO_4]^-$), a phosphate anion (e.g., $[PO_4]^{3-}$, $[(RO)_3PO]^-$, $[PF_6]^-$, organic phosphates) a sulfate anion (e.g., $SO_2^{2-}$, $[F_3CSO_3]^-$), a borate anion (e.g., $[BF_4]^-$, $[BAr^F_4]^-$, $[B(C_6F_5)_4]^-$), derivatives thereof, or any mixture thereof. For example, the anion $A^-$ can be a carboxylate, such as a conjugate base of an organic acid, that includes an acetate anion, a citrate anion, an oxalate anion, a lactate anion, a formate anion, derivatives thereof, or any mixture thereof. In some examples, the anion $A^-$ can be an acetate anion.

The number of styrene monomer units "m" can be an integer of 1 to 20, or 1 to 10, or 1 to about 5, for example, 1, 2, 3, 4, or 5. In some examples, the number of styrene monomer units "m" can be 1, 2, or 3. The number of cationic SMI monomer units "n" can be an integer of about 5 to about 5,000, about 5 to about 1,000, about 5 to about 800, about 5 to about 500, or about 10 to about 400, for example, 14 (e.g., MW is about 5,000), 144 (e.g., MW is about 80,000), or 360 (e.g., MW is about 200,000). In some examples, the number of styrene monomer units "m" can be 1 and the number of cationic SMI monomer units "n" can be about 5 to about 100. In other examples, the number of styrene monomer units "m" can be 2 and the monomer units of the number of cationic SMI monomer units "n" can be about 20 to about 200. In other examples, the number of styrene monomer units "m" can be 3 and the number of cationic SMI monomer units "n" can be about 50 to about 300.

The cationic SMI resin can have a styrene to maleimide molar ratio of about 1:1 to about 20:1, about 1:1 to about 10:1, or about 1:1 to about 5:1. In many examples, the styrene to maleimide molar ratio of the cationic SMI resin can be about 1:1 to about 5:1, such as, for example, about 1:1, about 2:1, about 3:1, about 4:1, or about 5:1. In other examples, the styrene to maleimide molar ratio of the cationic SMI resin can be greater than 5:1, such as about 6:1 to about 12:1 or greater, for example, about 6:1, about 7:1, about 8:1, about 9:1, about 10:1, about 11:1, about 12:1, or greater.

The weight average molecular weight for the cationic SMI resin can be proportional based on the styrene to maleimide molar ratio. The cationic SMI resin can have a weight average molecular weight ($M_W$, in Daltons) of about 500 to about 200,000, about 1,000 to about 100,000, or about 2,000 to about 80,000. In some examples, the number of styrene monomer units "m" can be 1 and the number of cationic SMI monomer units "n" can be about 5 to about 50, about 7 to about 40, about 10 to about 30, about 10 to about 20, about 10 to about 18, about 12 to about 16, about 12 to about 14, about 13 to about 15, or about 14 to about 16, and the weight average molecular weight can be about 5,000. In other examples, the number of styrene monomer units "m" can be 3 and the number of cationic SMI monomer units "n" can be about 120 to about 180, about 124 to about 170, about 130 to about 170, about 130 to about 160, about 130 to about 150, about 134 to about 148, about 140 to about 150, about 144 to about 150, about 120 to about 144, about 140 to about 148, or about 142 to about 146, and the weight average molecular weight can be about 80,000. In other examples, the number of styrene monomer units "m" can be 3 and the number of cationic SMI monomer units "n" can be about 320 to about 400, about 330 to about 400, about 340 to about 400, about 350 to about 400, about 360 to about 400, about 320 to about 390, about 330 to about 380, about 340 to about 370, about 350 to about 360, about 340 to about 380, about 340 to about 360, or about 350 to about 370, and the weight average molecular weight can be about 200,000.

The cationic SMI resin can have the chemical formula (B):

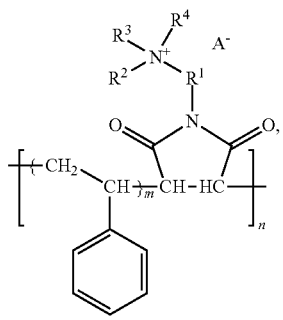

(B)

where "$R^1$" can be a substituted or unsubstituted organic diyl group and each "$R^2$", "$R^3$", and "$R^4$" can independently be a hydrogen or a substituted or unsubstituted linear, branched, cyclic, heterocyclic, or aromatic hydrocarbyl group. As discussed above with respect to the cationic SMI resin having the chemical formula (A), the anion "$A^-$" can be any of the anions, "m" can be any of the integers for the number of styrene monomer units, and "n" can be any of the integers for the number of cationic SMI monomer units.

In many examples, the substituted or unsubstituted organic diyl group "$R^1$" can be methanediyl (—$CH_2$—), ethanediyl (—$CH_2CH_2$—), propanediyl (—$CH_2CH_2CH_2$—), butanediyl (—$CH_2(CH_2)_2CH_2$—), pentanediyl (—$CH_2(CH_2)_3CH_2$—), hexanediyl (—$CH_2(CH_2)_4CH_2$—), heptanediyl (—$CH_2(CH_2)_5CH_2$—), octanediyl (—$CH_2(CH_2)_6CH_2$—), nonanediyl (—$CH_2(CH_2)_7CH_2$—), decanediyl (—$CH_2(CH_2)_8CH_2$—), undecanediyl (—$CH_2(CH_2)_9CH_2$—), dodecanediyl (—$CH_2(CH_2)_{10}CH_2$—), isomers thereof, halide-substituted derivatives thereof, or any mixture thereof. The substituted organic diyl group "$R^1$" can be propanediyl, and the maleimide portion of the cationic SMI resin can be an aminopropylamine maleimide. If each of "$R^2$", "$R^3$", and/or "$R^4$" is a substituted or unsubstituted linear, branched, cyclic, heterocyclic, or aromatic hydrocarbyl group, then each of "$R^2$", "$R^3$", and "$R^4$" can independently be alkyl, alkenyl, alkynyl, phenyl, aryl, alkanol, alkoxyl, amino, isomer thereof, or derivative thereof. In many examples, each of $R^2$, $R^3$, and $R^4$ can independently be hydrogen, methyl, ethyl, propyl, butyl, pentyl, isomer thereof, or derivative thereof. The maleimide portion of the cationic SMI resin can be an aminopropylamine maleimide and $R^2$, $R^3$, and $R^4$ can each be independently hydrogen, methyl, or ethyl. In some examples, the $R^2$ can be hydrogen, $R^3$ can be methyl, and $R^4$ can be methyl, and the maleimide portion of the cationic SMI resin can be dimethylaminopropylamine (DMAPA) maleimide. In other examples, the $R^2$ can be hydrogen, $R^3$ can be hydrogen, and $R^4$ can be methyl, and the maleimide portion of the cationic SMI resin can be methylaminopropylamine maleimide. In other examples, the $R^2$ can be hydrogen, $R^3$ can be hydrogen, and $R^4$ can be hydrogen, and the maleimide portion of the cationic SMI resin can be aminopropylamine maleimide.

In other examples, the cationic SMI resin can be a copolymer of styrene and DMAPA maleimide and can have one or more of the following chemical formulas (C), (D), or (E):

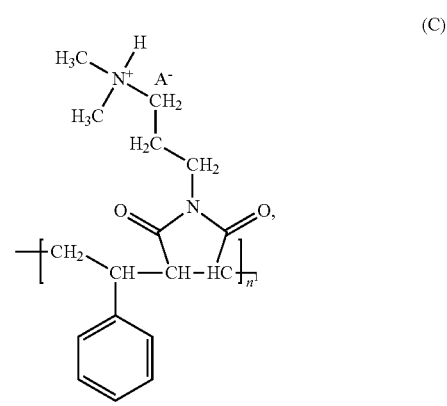

(C)

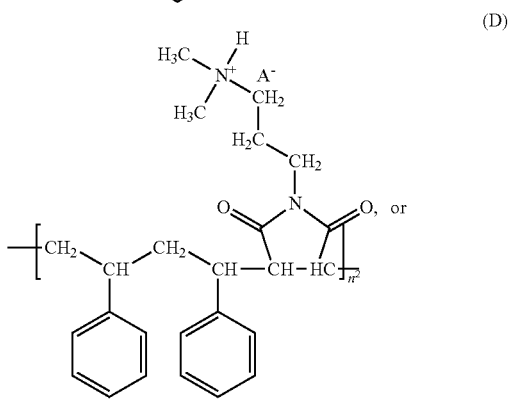

(D)

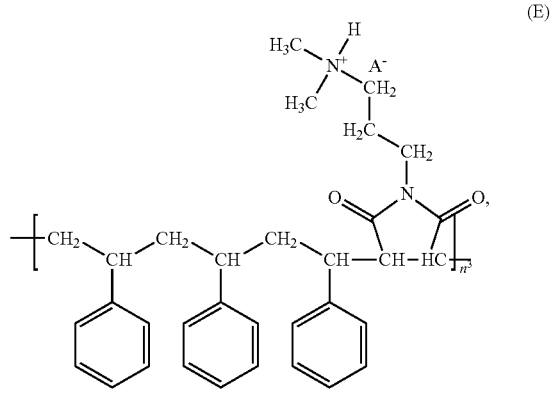

(E)

where $A^-$ can be an anion and each of "$n^1$", "$n^2$", and "$n^3$" can independently be an integer for the number of cationic SMI monomer units. As discussed above with respect to the cationic SMI resin having the chemical formula (A), the anion $A^-$ can be any of the anions. The number of cationic SMI monomer units "$n^1$", "$n^2$", and "$n^3$" can independently be about 5 to about 5,000, about 5 to about 1,000, about 5 to about 800, about 5 to about 500, or about 10 to about 400. In some examples, $n^1$ can be about 5 to about 100, $n^2$ can be about 20 to about 200, and $n^3$ can be about 50 to about 300.

The cationic SMI resin can include copolymers of styrene and DMAPA maleimide, such as, for example, copolymers of styrene and DMAPA maleimide acetate. The cationic SMI resin as a copolymer of styrene and DMAPA maleimide acetate can have one or more of the following chemical formulas (F), (G), or (H):

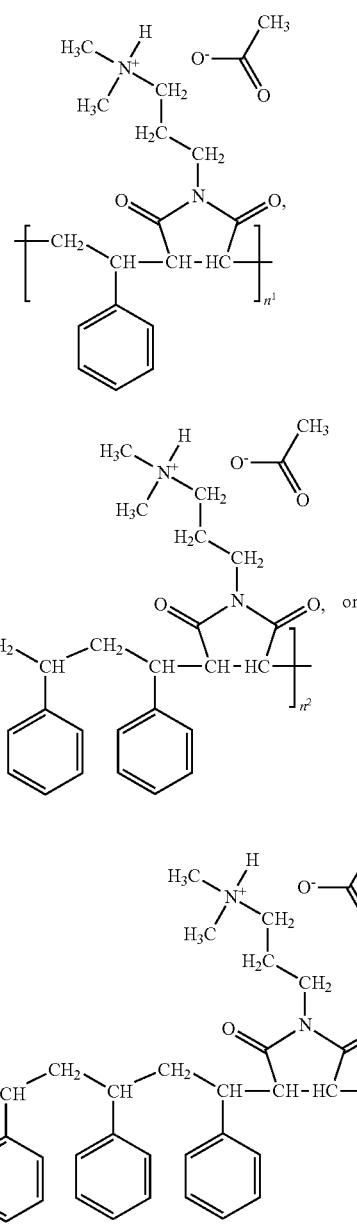

where each $n^1$, $n^2$, and $n^3$ can independently be about 5 to about 5,000, about 5 to about 1,000, or about 5 to about 800, such as where $n^1$ can be about 5 to about 100, $n^2$ can be about 20 to about 200, and $n^3$ can be about 50 to about 300.

The PAE resin of the wet strengthening resin can be a reaction product of a polyamidoamine and an epihalohydrin. The polyamidoamine can be or include a reaction product of a polyamine and a dicarboxylic acid. In some examples, the polyamine can be dimethylenetriamine, diethylenetriamine, triethylenetetramine, tripropylenetetramine, tetraethylenepentamine, pentaethylenehexamine, or any mixture thereof. The dicarboxylic acid can be glutaric acid, adipic acid, azelaic acid, malonic acid, suberic acid, sebacic acid, succinic acid, oxalic acid, pimelic acid, derivatives thereof, or any mixture thereof. The epihalohydrin can be or include epichlorohydrin, epibromohydrin, epifluorohydrin, epiiodohydrin, or any mixture thereof. In one example, the polyamidoamine can be in a concentration of about 0.56 moles to about 1.35 moles and the epihalohydrin can be in a concentration of about 0.75 moles to about 1.8 moles when reacted with one another. In another example, the polyamine can be in a concentration of about 0.9 moles to about 1.1 moles and the dicarboxylic acid can be in a concentration of about 0.9 moles to about 1.1 moles.

In some examples, suitable PAE resins contained in the wet strengthening resins can be prepared by reacting one or more polyamidoamines and one or more epihalohydrins. For example, a polyamidoamine can be prepared by reacting (1) one or more dicarboxylic acids and/or one or more esters of a dicarboxylic acid and (2) one or more polyamines. The polyamine can include secondary and/or tertiary amine groups. The dicarboxylic acid can be a saturated aliphatic dibasic carboxylic acid, often having from 3 carbon atoms to about 10 carbon atoms and mixtures thereof. Dicarboxylic acids having from 4 carbon atoms to about 8 carbon atoms chains can be used, with adipic acid, or glutaric acid being most often used. Illustrative dicarboxylic acids can include, but are not limited to, malonic acid, succinic acid, glutaric acid, adipic acid, suberic acid, sebacic acid, or any mixture thereof. Illustrative esters of dicarboxylic acids can include, but are not limited to, dimethyl glutarate, diethyl glutarate, dimethyl adipate, diethyl adipate, or any mixture thereof. Illustrative first epihalohydrins can include, but are not limited to, epichlorohydrin, epibromohydrin, epifluorohydrin, epiiodohydrin, or any mixture thereof.

The polyamine reacted with the dicarboxylic acid and/or ester of a dicarboxylic acid to produce the polyamidoamine can include, but is not limited to, one or more compounds having the chemical formula (J): $H_2N[(CH_2)_xNH]_yH$, where x and y can be integers independently selected from 2 to 10. Specific examples polyalkene polyamines can include, but are not limited to, diethylenetriamine (x=2, y=2), triethylenetetramine (x=2, y=3), tripropylenetetramine (x=3, y=3) tetraethylenepentamine (x=2, y=4), and pentaethylenehexamine (x=2, y=5). Other examples of polyamines can include methyl bis(3-aminopropyl)-amine, dipropylenetriamine, bis(hexamethylene)triamine, bis-2-hydroxyethyl ethylenediamine. The polyamidoamine can include secondary amine groups derived from a polyalkylene polyamine.

The polyamidoamine can be prepared by heating a mixture of the dicarboxylic acid and the polyamine to about 110° C. to about 250° C. For example, the mixture of the dicarboxylic acid and the polyamine can be heated to a temperature of about 110° C., about 125° C., about 140° C. to about 160° C., about 175° C., about 190° C., or about 200° C. under atmospheric pressure.

In carrying out the reaction between the polyamine and the dicarboxylic acid, the amount of the dicarboxylic acid can be sufficient to react substantially completely with the primary amine groups of the polyalkylene polyamine, but insufficient to substantially react with the secondary amine groups of the polyamine. The molar ratio of the polyamine to the dicarboxylic acid can be about 0.8:1, about 0.85:1, about 0.9:1, about 0.95:1, or about 1:1 to about 1:1, about 1.05:1, about 1.1:1, about 1.2:1, about 1.3:1, or about 1.4:1. For example, the molar ratio of the polyamine to the dicarboxylic acid can be about 0.8:1 to about 1.4:1, about 0.9:1 to about 1.2:1, about 0.9:1 to about 1:1, about 1:0.95 to about 1:1.05, about 1:0.9 to about 1:1.1, about 1:0.85 to about 1:1.1, or about 0.95:1 to about 1.05:1. In another example, the molar ratio of the polyamine to the dicarboxylic acid can be about 0.9 moles to about 1.1 moles of a polyamine to about 1.1 moles to about 0.9 moles of a dicarboxylic acid.

If the reaction between the polyamine and the dicarboxylic acid is carried out under a reduced pressure the reaction temperature can be reduced to about 75° C. to 150° C. The time of reaction can depend, at least in part, on the temperature and/or pressure and can generally be from about 0.5 hours to about 4 hours. The reaction can be continued to substantial completion. The reaction between the polyamine and the dicarboxylic acid can produce water as a byproduct, which can be removed by distillation. At the end of the reaction, the resulting product can be dissolved or dispersed in water to provide any desired concentration such as an aqueous polyamidoamine resin having about 50 wt % total resin solids.

When a diester is used instead of a dicarboxylic acid for reaction with the polyamine, the polymerization can be conducted at a lower temperature, such as about 100° C. to about 175° C. under atmospheric pressure. In this case, the byproduct will be or at least include an alcohol, the type of alcohol depending upon the identity of the diester. For example, if a dimethyl ester is used as a reactant, the alcohol byproduct will be methanol. In another example, if a diethyl ester is used as a reactant, the alcohol byproduct will be ethanol. The molar ratio between the polyamine and the diester can be the same as the ratio between the polyamine and the dicarboxylic acid. If the reaction between the polyalkylene polyamine and the diester is carried out under a reduced pressure, the reaction temperature can be reduced, such as at a temperature of about 75° C. to about 150° C.

The amount of the epihalohydrin reacted with the polyamidoamine to produce the PAE resin can be controlled or limited. For example, the molar ratio of the epihalohydrin to the polyamidoamine can be about 0.75:1, about 0.8:1, about 0.85:1, about 0.9:1, about 0.95:1, or about 1:1 to about 1.2:1, about 1.4:1, about 1.6:1, about 1.8:1, or about 2:1. In another example, the molar ratio of the epihalohydrin to the polyamidoamine can be about 0.55:1 to about 1:1, about 0.75:1 to about 2:1, about 0.9:1 to about 1.1:1, about 1.2:1 to about 1.4:1, about 1.1:1 to about 1.7:1, about 1.4:1 to about 1.9:1, or about 0.95:1 to about 1.7:1. In another example, the molar ratio of the epihalohydrin to the polyamidoamine can be about 0.75 moles to about 1.8 moles epihalohydrin to about 0.56 moles to about 1.35 moles of the polyamidoamine.

The polyamidoamine can be reacted with the epihalohydrin at a temperature of about 0° C., about 10° C., about 20° C., about 25° C., about 30° C., or about 35° C. to about 60° C., about 70° C., about 80° C., about 90° C., or about 100° C. The extent of reaction between the polyamidoamine and the epihalohydrin can be controlled so that the polyamidoamine is only partially reacted with the epihalohydrin. In some examples, the reaction can be controlled such that about 25 wt % to about 35 wt % solids solution at 25° C. can be about 350 cP or less, or 300 cP or less, or 250 cP or less. In other examples, the reaction can be controlled such that about 25 wt % to about 35 wt % solids solution at 25° C. can be about 125 cP to about 375 cP, about 200 cP to about 300 cP, about 250 cP to about 350 cP, or about 220 cP to about 375 cP. The viscosity of the various compositions discussed and described herein can be measured using a Brookfield Viscometer at a temperature of about 25° C. For example, a Brookfield Viscometer, Model DV-II+, with a small sample adapter with, for example, a number 3 spindle, can be used. The small sample adapter can allow the sample to be cooled or heated by the chamber jacket to maintain the temperature of the sample surrounding the spindle at a temperature of about 25° C.

When the desired viscosity is reached, sufficient water can be added to adjust the solids content of the PAE resin solution to a desired amount. For example, the PAE resin can have a solids concentration of about 5 wt %, about 10 wt %, or about 15 wt % to about 20 wt %, about 30 wt %, about 40 wt %, about 60 wt %, about 80 wt %, about 90 wt %, or about 95 wt %. The PAE resin can be cooled to a temperature of about 25° C. In another example the PAE resin can have a solids concentration of about 8 wt %, about 10 wt %, about 12 wt % or about 14 wt % to about 22 wt %, about 25 wt %, about 27 wt %, or about 30 wt %. In another example, the PAE resin can be in the form of an aqueous dispersion, suspension, or solution and have a solids concentration of about 20 wt % to about 50 wt %.

The reaction between the polyamidoamine and the epihalohydrin can be carried out in as an aqueous solution to moderate or otherwise control the reaction. Although not necessary, the pH value of the aqueous solution can be adjusted to increase or decrease the rate of residual cross-linking in the resin.

The polyamidoamine that can be used for producing the PAE resin can have a weight average molecular weight of about 10,000 and up to about 100,000. For example, the polyamidoamine can have a weight average molecular weight of about 10,000, about 15,000, about 20,000, about 25,000, or about 30,000 to about 55,000, about 65,000, about 75,000, about 80,000, or about 90,000. In another example, the polyamidoamine can have a weight average molecular weight of about 35,000 to about 55,000, about 35,000 to about 45,000, about 40,000 to about 50,000, about 20,000 to about 65,000, about 30,000 to about 70,000, or about 35,000 to about 50,000.

As known by those skilled in art, resin molecular weights can be determined using Gel Permeation Chromatography (GPC). A suitable GPC method can use an aqueous mobile phase which can also serve as a solvent/diluent for the samples. Separation can be achieved with an PL aquagel-OH column or a PLgel MIXED-H column, commercially available from Agilent Technologies, Inc., calibrated with, for example, polyethylene glycols (PEG) and polyethylene oxides (PEO). A particular resin sample can be diluted and can be injected into a GPC system or an equivalent system, available from Waters Corporation. The data collected from the GPC system can be used to determine the molecular weight average from the calibration curve used in the normal manner with integration of the distribution curve. The method for determining the molecular weight of a resin sample is well understood by those skilled in the art and other configurations and reference materials can conveniently be used.

The PAE resin can have a pH of about 2.5, about 3, about 3.5, or about 4 to about 4.5, about 5, about 5.5, about 6, about 6.5, about 7, or about 8. For example, the pH of the PAE resin can be about 2 to about 5, about 2.5 to about 3.5, about 3 to about 4.5, about 4 to about 6, or about 2.5 to about 5.5. In some examples, the stability of the PAE resin can be improved to resist gelation by adding sufficient acid to reduce the pH to about 6 or less, about 5 or less, or about 4 or less. Any suitable inorganic or organic acid such as hydrochloric acid, sulfuric acid, methanesulfonic acid, nitric acid, formic acid, phosphoric acid and acetic acid can be used to stabilize the product. Other compounds that can be used to improve the stability of the PAE resin can include, but are not limited to, urea, aluminum sulfate, or a mixture thereof.

The PAE resin having a solids content of about 25 wt % to about 35 wt % can have a viscosity of about 5 cP, about 100 cP, or about 200 cP to about 500 cP, about 750 cP, or about 1,000 cP at a temperature of 25° C. For example, the PAE resin having a solids content of about 25 wt % to about 35 wt % can have a viscosity of about 5 cP to about 50 cP, about 50 cP to about 100 cP, about 80 cP to about 250 cP, about 100 cP to about 150 cP, about 150 cP to about 200 cP, about 200 cP to about 250 cP, about 250 cP to about 350 cP, or about 350 cP to about 1,000 cP at a temperature of 25° C.

The PAE resin can have a weight average molecular weight of about 20,000 to about 3,000,000. In some examples, the PAE resin can have a lower weight PAE resin or polymer, a higher weight PAE resin or polymer, or a combination of the lower and higher weight resin or polymer. The lower weight PAE resin can have a weight average molecular weight of about 20,000 to about 500,000, or about 40,000 to about 200,000. The higher weight PAE resin can have a weight average molecular weight of about 500,000 to about 3,000,000, or about 800,000 to about 1,200,000.

In other examples, the weight average molecular weight of the PAE resin can be about 300,000, about 400,000, about 500,000, about 600,000, about 650,000, or about 700,000 to about 950,000, about 1,000,000, about 1,100,000, about 1,200,000, or about 1,300,000. For example, the weight average molecular weight of the resin can be about 400,000 to about 1,200,000, about 500,000 to about 1,050,000, about 600,000 to about 1,000,000, about 750,000 to about 950,000, about 800,000 to about 850,000, or about 850,000 to about 900,000. In another example, the PAE resin can have a weight average molecular weight of less than 1,300,000, less than 1,200,000, less than 1,100,000, less than 1,000,000, or less than 950,000 and greater than 400,000, greater than 500,000, greater than 600,000, greater than 700,000, or greater than 750,000.

The PAE resin can have a charge density that is enhanced over that of conventional resins. For example, the PAE resin can have a charge density of about 1.5 mEq/g to about 4 mEq/g of solids. In another example, the PAE resin can have a charge density of about 1.5 mEq/g of solids, 1.70 mEq/g of solids, about 1.8 mEq/g of solids, about 1.85 mEq/g of solids, about 1.9 mEq/g of solids, about 1.95 mEq/g of solids, or about 2.0 mEq/g of solids to about 2.2 mEq/g of solids, about 2.3 mEq/g of solids, about 2.4 mEq/g of solids, about 2.5 mEq/g of solids, about 2.6 mEq/g of solids, about 2.7 mEq/g of solids, or about 3.0 mEq/g of solids, as measured by streaming electrode potential using a titrator or a particle charge detector (PCD), such as a Mütek PCD. For example, the PAE resin can have a charge density of about 1.50 mEq/g of solids to about 1.7 mEq/g of solids, about 1.5 mEq/g of solids to about 3.0 mEq/g of solids, about 1.9 mEq/g of solids to about 2.5 mEq/g of solids, about 2.0 mEq/g of solids to about 2.8 mEq/g of solids, about 1.7 mEq/g of solids to about 2.4 mEq/g of solids, about 2.5 mEq/g of solids to about 3.0 mEq/g of solids, about 2.25 mEq/g to about 3.5 mEq/g of solids, about 2.3 mEq/g to about 3.35 mEq/g of solids, or about 2.4 mEq/g to about 3.2 mEq/g of solids. The charge density of the PAE resin can be measured via a streaming electrode potential using a titrator or a Mütek PCD.

The PAE resin can also have an azetidinium ratio, or "Azet" ratio. The Azet ratio is the ratio of the polymer segments containing azetidinium ion to the total number of polymer segments. A single polymer segment is defined by a condensation moiety derived from one diacid molecule (for example, adipic acid) and one triamine molecule (for example, diethylenetriamine or DETA), as illustrated below.

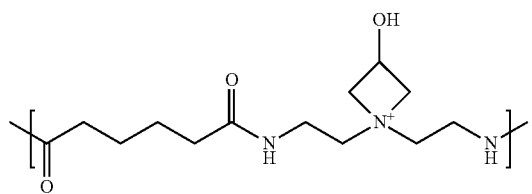

The azetidinium ratio can be determined by quantitative (inverse gated heteronuclear decoupled) $^{13}$C NMR spectroscopy, using a relaxation time of 22.5 seconds, spectral width of 15 kHz (240 ppm), and a scan count of 320 scans to 1,024 scans. Measurements can be made by integration of the methylene peaks in the azetidinium ion and the inner carbons of the adipic acid portion of the polymer. The adipic acid portion can be assigned to be the total number of polymer segments. Thus when the polymer can be prepared using adipic acid, the azetidinium ratio can be determined according to the formula: Azetidinium Ratio (Azet Ratio)= A(azet)/A(adip), where, A(azet) is the integrated area of methylenes from azetidinium ions, and A(adip) is the integrated area of methylenes from the adipic moiety (total polymer segments). This method can be adapted to any resin discussed and described herein. Thus, for adipic acid based polymers, the azetidinium ion peak at 74 ppm and the backbone methylene peak at 25 ppm can both be integrated and the methylene peak at 25 ppm can be normalized to 1. For glutaric acid based polymers, the azetidinium ion peak at 74 ppm and the backbone methylene peak at 22 ppm can both be integrated and the methylene peak at 22 ppm can be normalized to 1.

The PAE resin can have an azetidinium ratio of about 0.4, about 0.5, about 0.6, or about 0.7 to about 0.8, about 0.9, about 1, about 1.1, about 1.15, about 1.2, about 1.3, about 1.4, or about 1.5. For example, the PAE resin can have an azetidinium ratio of about 0.4 to about 1.5, about 0.4 to about 1.3, about 0.4 to about 1.1, about 0.4 to about 1, about 0.5 to about 1.5, about 0.5 to about 1.3, about 0.5 to about 1.2, about 0.5 to about 1.15, about 0.5 to about 1.1, about 0.5 to about 1, about 0.6 to about 1.5, about 0.6 to about 1.3, about 0.6 to about 1.1, about 0.6 to about 1, about 0.7 to about 1.5, about 0.7 to about 1.3, about 0.7 to about 1.1, about 0.7 to about 1, or about 0.7 to about 0.9. In other examples, the PAE resin can have an azetidinium ion ratio of about 0.5, about 0.55, about 0.6, or about 0.65 to about 0.7, about 0.75, about 0.8, about 0.85, or about 0.9. For example, the PAE resin can have an azetidinium ion ratio of about 0.55 to less than 1, about 0.5 to about 0.9, about 0.55 to about 0.8, about 0.65 to about 0.8, about 0.55 to about 0.7, or about 0.6 to about 0.7.

In some examples, the PAE resin can be formed by separating the synthesis process into discrete or separate steps, such as the reaction of the polyamidoamine with one or more symmetric cross-linkers in a first reaction step and the reaction of the intermediate cross-linked polymer with one or more epihalohydrins in a second reaction step. The second reaction step can be affected under reaction conditions that favor optimized azetidinium group formation over further cross-linking. The asymmetric functionality of epihalohydrins can be useful in this functionalization to allow a relatively facile reaction of the epoxy group with secondary amines to form a pendant halohydrin moiety, followed by an intramolecularly cyclization of the pendant halohydrin to generate a cationic azetidinium functionality. This latter intramolecular cyclization typically utilizes heating of the halohydrin-functionalized polymer.

Examples of symmetric crosslinkers can be or include, but are not limited to, a diacrylate, a bis(acrylamide), a diepoxide, a polyazetidinium compound, or any mixture thereof. By way of example, useful symmetric crosslinkers can be or include one of the following:

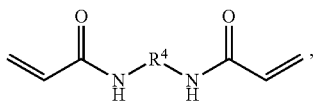

where $R^4$ can be $(CH_2)_t$ and t can be 1, 2, 3, or 4;

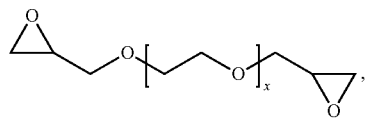

where x can be 1 to about 100;

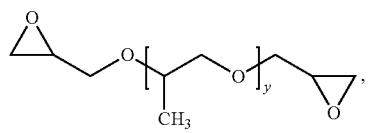

where y can be 1 to about 100;

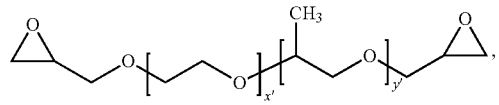

where x'+y' can be 1 to about 100; and/or

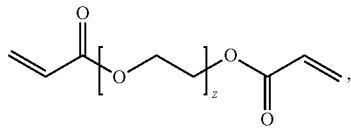

where z can be 1 to about 100; or any mixture thereof.

Illustrative symmetric crosslinkers can be or include, but are not limited to, N,N'-methylenebisacrylamide (MBA), N,N'-methylenebismethacrylamide (MBMA), poly(ethyleneglycol) diglycidyl ether (PEG-DGE), poly(propyleneglycol) diglycidyl ether (PPG-DGE), poly(ethyleneglycol) diacrylate (PEG-DA), poly(propyleneglycol) diacrylate (PPG-DA), one or more polyazetidinium compounds, isomers thereof, alkylated derivatives thereof, salts thereof, or any mixture thereof.

The symmetric crosslinker can be or include certain polymers or copolymers that have a type of functional moiety that can be reactive with secondary amines, that is, that can function as the symmetric crosslinkers discussed and described herein. In some examples, the symmetric crosslinkers can be polymers or copolymers that have azetidinium functional groups. The symmetric crosslinkers can be, for example, copolymers of acrylates, methacrylates, alkenes, dienes, or derivatives thereof, with azetidinium-functionalized monomers. Illustrative azetidinium-functionalized monomers can include, but are not limited to, 1-isopropyl-3-(methacryloyloxy)-1-methylazetidinium chloride, 1,1-diallyl-3-hydroxyazetidinium chloride, other halogen derivatives thereof, salts thereof, or mixtures thereof. The symmetric crosslinkers can also be or include, copolymers of one or more acrylates, one or more methacrylates, one or more alkenes, one or more dienes, or any mixture thereof with other azetidinium-functionalized monomers.

In some examples, the second reaction step can be carried out using any epihalohydrin, such as epichlorohydrin, epibromohydrin, and epiiodohydrin, or any mixture thereof. However, epichlorohydrin is typically the most common epihalohydrin used in this reaction step. When reciting epihalohydrin or epichlorohydrin in this disclosure, such as in formulas, structures, or reaction schemes, any one or any combination of the epihalohydrins can be used in the process.

By way of example, using the intermediate cross-linked polymer derived from adipic acid and DETA (diethylenetriamine) and cross-linking using methylenebisacrylamide (MBA), the epichlorohydrin functionalization product can be illustrated by the chemical formula (K), termed a halohydrin-functionalized polymer (e.g., such as a chlorohydrin-functionalized polymer):

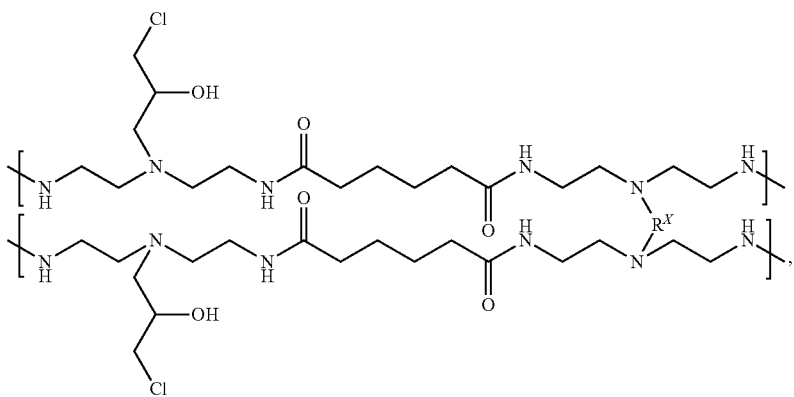

(K)

where the crosslinking moiety $R^X$ can be a symmetric crosslinking moiety made, derived, or otherwise produced from the symmetric crosslinker.

The reaction of epihalohydrins such as epichlorohydrin can generally be tailored to consume a high percentage or the remaining secondary amine moieties in generating the halohydrin-functionalized polymer, in this case, a chlorohydrin-functionalized polymer.

The formation of the halohydrin-functionalized polymer can be carried out using a range of epichlorohydrin molar ratios, but this reaction is typically carried out using an excess of epichlorohydrin. The stoichiometric reaction of epichlorohydrin with a secondary amine group can have a 1:1 molar ratio of epichlorohydrin with a secondary amine. In some examples of the reaction of epichlorohydrin with the secondary amine group, the moles of epichlorohydrin per one mole of the secondary amine group can be about 0.8 moles to about 3.0 moles, about 0.9 moles to about 2.5 moles, about 1.0 mole to about 2.0 moles, about 1.1 moles to about 1.7 moles, about 1.2 moles to about 1.5 moles, or about 1.25 moles to about 1.45 moles. In other examples of the reaction of epichlorohydrin with the secondary amine group, the moles of epichlorohydrin per one mole of the secondary amine group can be about 0.8, about 0.9, about 1.0, about 1.1, about 1.2, about 1.3, about 1.4, about 1.5, or about 1.6.

A further aspect of the process can be that sufficient amounts of symmetric cross-linker and epihalohydrin can be employed such that the resin composition prepared by the process can include substantially no secondary amine groups. This result can be affected by using the molar amounts and ratios disclosed herein, but resin compositions prepared by this disclosure can include substantially no secondary amine groups even when molar amounts and ratios outside those recited are used. By substantially no secondary amine groups, it is intended that less than 10% of the original secondary amines in the starting PAE resin prior to it cross-linking, functionalization, and cationization reactions remain. Alternatively, less than 5%; alternatively, less than 2%; alternatively, less than 1%; alternatively, less than 0.5%; alternatively, less than 0.2%; alternatively, less than 0.1%; alternatively, less than 0.01%; alternatively, less than 0.005%; or alternatively, less than 0.001% of the original secondary amines in the starting PAE resin remain.

The halohydrin-functionalized resin/polymer (e.g., chlorohydrin-functionalized resin/polymer) can be converted to the wet-strength resin composition by subjecting it to cyclization conditions to form azetidinium ions. This step can include heating the chlorohydrin-functionalized polymer. In contrast to the conventional method in which heating induces both cross-linking and cyclization, the cross-linking portion of the processes described and discussed herein can be completed when the cyclization can be carried out, thereby affording greater process control and the ability to more closely tailor the desired properties of the resulting resin. Also in contrast to the conventional methods, the processes described and discussed herein can reduce and/or minimize the formation of 1,3-dichloro-2-propanol (1,3-DCP or "DCP"), 3-chloropropane-1,2-diol (3-CPD or "CPD"), and/or other epichlorohydrin byproducts remaining in the resin can be reduced or minimized.

The concentration of DCP remaining in the strengthening resin at 25% solids (DCP @ 25%) can be less than 15,000 ppm. For example, the strengthening resin at 25% solids can be less than 14,000 ppm, less than 13,000 ppm, less than 12,000 ppm, less than 11,500 ppm, less than 11,000 ppm, less than 10,500 ppm, less than 10,000 ppm, less than 8,000 ppm, less than 6,000 ppm, less than 5,000 ppm.

The chlorohydrin-functionalized polymer having the chemical formula (K) can be used to form a quaternary nitrogen-based resin, which has been subjected to conditions sufficient to intramolecularly cyclize the pendant chlorohydrin to impart azetidinium functionality. Illustrative quaternary nitrogen-based resins can be or include resins having the chemical formula (L)

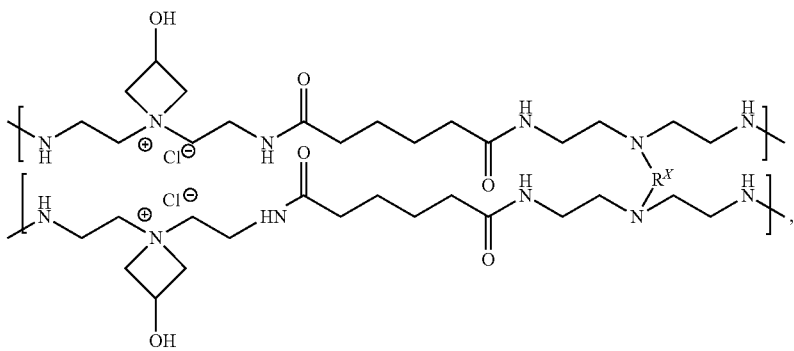

(L)

In the process for forming the PAE resin, the PAE resin can be generated by subjecting the halohydrin-functionalized polymer to cyclization conditions sufficient to convert the halohydrin groups to form azetidinium ions. In some examples, at least a portion of the halohydrin groups can be cyclized to form azetidinium ions. For example, at least 90%, at least 95%, at least 97%, at least 98%, at least 98.5%, at least 99%, at least 99.5%, at least 99.7%, at least 99.8%, or at least 99.9% of the halohydrin groups can be cyclized to form azetidinium ions.

The PAE resin can have a weight average molecular weight of about 20,000 to about 3,000,000, about 50,000 to about 2,500,000, about 100,000 to about 2,000,000, about 50,000 to about 1,500,000, about 100,000 to about 1,000,000. For example, the PAE resin can have a weight average molecular weight of about 50,000 to about 1,700,000. In other examples, the PAE resin can have a weight average molecular weight of about 600,000 to about 1,600,000, about 700,000 to about 1,500,000, about 800,000 to about 1,300,000, or about 900,000 to about 1,100,000. The PAE resin can have an azetidinium equivalent weight, defined as the degree of polymerization multiplied times the Azet ratio, or (degree of polymerization)×(Azet), of about 1,600 to about 3,800, about 1,800 to about 3,500, or about 2,000 to about 2,900.

Suitable methods for preparing PAE resins can include those discussed and described in U.S. Pat. Nos. 2,926,116; 3,058,873; 3,772,076; 5,338,807; 5,567,798; 5,585,456; and 8,246,781; U.S. Publication Nos.: 2012/0064323; 2014/0020858; and 2014/0166223; EP Patent No.: EP 0488767; Canadian Publication No.: CA 979,579; and GB Publication No.: GB 865,727(A). Many commercially available PAE resins are known and can be contained in the wet strengthening resins. Suitable commercially available PAE resins can include, but are not limited to, AMRES® resins available from Georgia-Pacific Chemicals LLC, KYMENE® resins available from Ashland-Hercules, and FENNOSTRENGTH® resins available from Kemira.

The wet strengthened fibers or paper products can be formed, made, or otherwise produced by various methods. The fibers (e.g., cellulosic fibers and/or other types of fibers), at least one PAE resin, and at least one cationic SMI resin can be combined to form or produce a fiber mixture. In some examples, the PAE resin can be combined with or added to the aqueous suspension containing fibers, then the cationic SMI resin can be combined with or added to the aqueous suspension to form the fiber mixture (e.g., cellulosic fiber mixture) containing the fibers, the PAE resin, and the cationic SMI resin. In other examples, the cationic SMI resin can be combined with or added to the aqueous suspension containing fibers, then the PAE resin can be combined with or added to the aqueous suspension to form the fiber mixture containing the fibers, the PAE resin, and the cationic SMI resin. In other examples, the cationic SMI resin and the PAE resin can be combined to form a mixture of wet strengthening resins, then at least fibers can be combined with the mixture of wet strengthening resins to form the fiber mixture containing the fibers, the PAE resin, and the cationic SMI resin.

The fiber mixture can contain the fibers, the PAE resin, and the cationic SMI resin, as well as any of the precursors of the fiber mixture, including aqueous suspensions or mixtures that contain the fibers, the PAE resin, the cationic SMI resin, water, or any mixture thereof, can be conditioned for a predetermined period of time during and between steps of combining components. Conditioning these mixtures upon the addition of the fibers, the PAE resin, and/or the cationic SMI resin can facilitate contact between the components. Conditioning can include, but is not limited to, agitating the mixture(s) for a given time period prior to subjecting the mixture to separation. For example, the mixtures containing the fibers, the PAE resin, and/or the cationic SMI resin, can be stirred, blended, mixed, or otherwise agitated for a time of about 30 seconds, about 1 minute, about 2 minutes, about 3 minutes or about 4 minutes to about 5 minutes, about 10 minutes, about 15 minutes, about 20 minutes, about 30 minutes, about 1 hour, or about 24 hours. Conditioning the mixture can also include heating (or cooling) the mixture to a temperature of about 1° C., about 20° C., or about 35° C. to about 60° C., about 80° C., or about 95° C.

Conditioning the mixture can also include adjusting the pH values of any of the mixtures containing the fibers, the PAE resin, and/or the cationic SMI resin. The pH values can be about 2, about 3, about 4, or about 5 to about 8, about 9, about 10, about 11, or about 12. For example, the pH of the mixture can be about 2 to about 12, about 4 to about 10, or about 6 to about 8, for example, about 7. Any one or combination of acid and/or base compounds can be combined with the liquid mixture to adjust the pH thereof.

Illustrative acid compounds that can be used to adjust the pH value of any of the mixtures containing the fibers, the PAE resin, and/or the cationic SMI resin can include, but are not limited to, one or more mineral acids, one or more organic acids, one or more acid salts, or any mixture thereof. Illustrative mineral acids can include, but are not limited to, hydrochloric acid, nitric acid, phosphoric acid, sulfuric acid, or any mixture thereof. Illustrative organic acids can include, but are not limited to, acetic acid, formic acid, citric acid, oxalic acid, uric acid, lactic acid, or any mixture thereof. Illustrative acid salts can include, but are not limited to, ammonium sulfate, sodium bisulfate, sodium metabisulfite, or any mixture thereof.

Illustrative base compounds that can be used to adjust the pH value of any of the mixtures containing the fibers, the PAE resin, and/or the cationic SMI resin can include, but are not limited to, hydroxides, carbonates, ammonia, amines, or any mixture thereof. Illustrative hydroxides can include, but are not limited to, sodium hydroxide, potassium hydroxide, ammonium hydroxide (e.g., aqueous ammonia), lithium hydroxide, and cesium hydroxide. Illustrative carbonates can include, but are not limited to, sodium carbonate, sodium bicarbonate, potassium carbonate, and ammonium carbonate. Illustrative amines can include, but are not limited to, trimethylamine, triethylamine, triethanolamine, diisopropylethylamine (Hunig's base), pyridine, 4-dimethylaminopyridine (DMAP), and 1,4-diazabicyclo[2.2.2]octane (DABCO).

The fiber web (e.g., cellulosic fiber web) and/or the fibers (e.g., cellulosic fibers) can include at least one material selected from bleached furnish, softwood, hardwood, paper pulp, mechanical pulp, or any mixture thereof. The term "cellulosic", "cellulosic sheet", "cellulosic fiber", "cellulosic fiber web", "fiber", "fiber web", and the like, is meant to include any product incorporating papermaking fiber having cellulose as a major constituent. "Papermaking fibers" include virgin pulps, recycle (secondary) cellulosic fibers, or fiber mixtures containing virgin cellulosic fibers and/or reconstituted cellulosic fibers. Fibers suitable for making the cellulosic fiber webs, fibrous sheets, and paper products and sheets of embodiments described herein can include: nonwood fibers, such as cotton fibers or cotton derivatives, abaca, kenaf, sabai grass, flax, esparto grass, straw, jute, hemp, bagasse, milkweed floss fibers, and pineapple leaf fibers; and wood fibers such as those obtained from deciduous and coniferous trees, including softwood fibers, such as Northern and Southern softwood kraft fibers; hardwood fibers, such as *Eucalyptus*, maple, birch, aspen, as well as a mixture or combination of softwoods and hardwoods, for example, a bleached furnish (60% hardwood and 40% softwood, by weight). Papermaking fibers used in connection with embodiments described herein can include naturally occurring pulp-derived fibers as well as reconstituted cellulosic fibers such as lyocell or rayon. Papermaking fibers can be liberated from their source material by any one of a number of chemical pulping processes familiar to one experienced in the art including sulfate, sulfite, polysulfide, soda pulping, as well as other processes. The pulp can be bleached if desired by chemical means including the use of chlorine, chlorine dioxide, oxygen, ozone, hydrogen peroxide, alkaline metal peroxide, alkaline earth metal peroxides, as well as other compounds. Naturally occurring pulp-derived fibers are referred to herein simply as "pulp-derived" papermaking fibers. The fiber or paper products of or by embodiments described herein can include a blend of conventional fibers (whether derived from virgin pulp or recycle sources) and high coarseness lignin-rich tubular fibers, such as bleached chemical thermomechanical pulp (BCTMP). Pulp-derived fibers thus can also include high yield fibers such as BCTMP as well as thermomechanical pulp (TMP), chemithermomechanical pulp (CTMP) and alkaline peroxide mechanical pulp (APMP). Recycled fibers are generally shorter, stiffer, curlier and more brittle than virgin fibers. Dewatering tests can assess fines content and the degree of external fibrillation. These tests measure how easily water drains from the papermaking pulp. The Schopper-Riegler (SR) number and the Canadian Standard Freeness (CSF) are the most common dewatering tests. The SR number increases with beating and fines content while the CSF decreases.

In other aspects of the method, the PAE resin can include a reaction product of a polyamidoamine and an epihalohydrin and the cationic SMI resin can include a reaction product of a SMA copolymer and an amine compound. The cationic SMI resin can have one or more of the chemical formulas (A)-(H), as well as derivatives thereof. In some examples, the cationic SMI resin can have a weight average molecular weight of about 500 to about 200,000 and a styrene to maleimide molar ratio of about 1:1 to about 5:1.

The method can further include forming fiber sheets (e.g., cellulosic fiber sheets) from the fiber mixture (e.g., cellulosic fiber mixture), so that the fiber sheets can contain at least the fibers, the PAE resin, and the cationic SMI resin. The method can also include at least partially curing the wet strengthening resin having the mixture of the PAE resin and the cationic SMI resin in the fiber sheets to form the wet strengthened fiber product.

The method can further include forming the fiber sheets by passing the fiber mixture through a sheet former to form the fiber sheets, applying pressure to the fiber sheets, and drying the fiber sheets. For example, the fiber sheets can be formed from the fiber mixture by a Noble & Wood® sheet former. The fiber sheets can be pressed with at least one blotter, but generally between two blotters subsequent to being formed by the sheet former. The fiber sheets can be pressed at a pressure of about 259 Torr to about 2,586 Torr, about 517 Torr to about 1,551 Torr, or about 776 Torr to about 1,293 Torr, for example, about 1,034 Torr. Also, the fiber sheets can be pressed for about 5 seconds to about 1 minute, or longer depending on the desire product.

The fiber sheets can be dried by heating the fiber sheets at a drying temperature with a sheet dryer. For example, the fiber sheets can be dried on an Adirondack dryer with one pass or multiple passes of the fiber sheets. The dryer can be a belt-driven and fabric-covered dryer. The drying temperature can be about 50° C. to about 200° C., about 100° C. to about 150° C., or about 110° C. to about 140° C., for example, about 115° C. or about 130° C. Generally, the fiber sheets can be dried for about 20 seconds to about 3 minutes.

Also, the method can further include at least partially curing the wet strengthening resin having the mixture of the PAE resin and the cationic SMI resin in the fiber sheets at a predetermined curing temperature for a curing time to form the wet strengthened fiber product. In one example, the fiber sheets can be cured in a forced-air, convection oven. The curing temperature can be about 80° C. to about 120° C., about 90° C. to about 115° C., or about 100° C. to about 110° C., for example, about 105° C. to form the wet strengthened fiber product. Also, the curing time can be about 2 minutes to about 20 minutes, about 2 minutes to about 10 minutes, or about 3 minutes to about 8 minutes, for example, about 5 minutes. In some examples, the fiber sheets can be cured at a curing temperature of about 90° C. to about 115° C., and for a curing time of about 3 minutes to about 10 minutes to form the wet strengthened fiber product.

In other examples, the method can further include that prior to at least partially curing, the wet strengthening resin containing the PAE resin and the cationic SMI resin can be present in the wet strengthened fiber product in an amount of about 0.05 wt % to about 5 wt %, based on a combined weight of the PAE resin and the cationic SMI resin relative to a dried weight of the wet strengthened fiber product.

The method can further include monitoring and/or adjusting to the pH value of the aqueous suspension to be about 6.0 to about 8.0 prior to adding the PAE resin into the aqueous suspension. In some examples, the cationic SMI resin can be added to the aqueous suspension of about 20 seconds to about 5 minutes after the PAE resin can be added to the aqueous suspension.

EXAMPLES

In order to provide a better understanding of the foregoing discussion, the following non-limiting examples are offered. Although the examples can be directed to specific embodiments, they are not to be viewed as limiting the invention in any specific respect.

The synergetic effects due to the wet strengthening resin contained within wet strengthened fiber products is highlighted by the results of Examples 1-7, summarized below in Table 1. The wet strengthening resins contain varying blends of the PAE and cationic SMI resin within each exemplary wet strengthened fiber product.

Example 1—Forming a Wet Strengthened Fiber Product (Wet Strengthening Resin: 100% PAE Resin and 0% Cationic SMI Resin)

The bleached furnish (about 60% hardwood and about 40% softwood) was diluted with water to a solids content of about 0.86% and had a Canadian Standard Freeness (CSF) of about 465. The pH was adjusted to about 7 and a PAE resin was added at a concentration of about 5.44 kg per 907.2 kg of dried paper product. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m$^2$ was tested to have a dry tensile strength of about 120.5 J/m and a wet tensile strength of about 23.1 J/m.

Example 2—Forming a Wet Strengthened Fiber Product (Wet Strengthening Agent: 83.3% PAE Resin and 16.7% Cationic SMI Resin)

The bleached furnish (about 60% hardwood and about 40% softwood) was diluted with water to a solids content of about 0.86% and had a CSF of 465. The pH was adjusted to about 7 and a PAE resin was added at a concentration of about 4.54 kg per 907.2 kg of dried paper product. After about 60 seconds, a cationic SMI resin (MW of about 80,000) was added at a concentration of about 0.91 kg per 907.2 kg of dried paper product to the mixture. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 113.9 J/m and a wet tensile strength of about 24.9 J/m.

Example 3—Forming a Wet Strengthened Fiber Product (Wet Strengthening Agent: 66.7% PAE Resin and 33.3% Cationic SMI Resin)

The bleached furnish (about 60% hardwood and about 40% softwood) was diluted with water to a solids content of about 0.86% and had a CSF of 465. The pH was adjusted to about 7 and a PAE resin was added at a concentration of about 3.63 kg per 907.2 kg of dried paper product. After about 60 seconds, a cationic SMI resin (MW of about 80,000) was added at a concentration of about 1.81 kg per 907.2 kg of dried paper product to the mixture. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 109.4 J/m and a wet tensile strength of about 21.4 J/m.

Example 4—Forming a Wet Strengthened Fiber Product (Wet Strengthening Agent: 50% PAE Resin and 50% Cationic SMI Resin)

The bleached furnish (about 60% hardwood and about 40% softwood) was diluted with water to a solids content of about 0.86% and had a CSF of 465. The pH was adjusted to about 7 and a PAE resin was added at a concentration of about 2.72 kg per 907.2 kg of dried paper product. After about 60 seconds, a cationic SMI resin (MW of about 80,000) was added at a concentration of about 2.72 kg per 907.2 kg of dried paper product to the mixture. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 120.5 J/m and a wet tensile strength of about 19.6 J/m.

Example 5—Forming a Wet Strengthened Fiber Product (Wet Strengthening Agent: 33.3% PAE Resin and 66.7% Cationic SMI Resin)

The bleached furnish (about 60% hardwood and about 40% softwood) was diluted with water to a solids content of about 0.86% and had a CSF of 465. The pH was adjusted to about 7 and a PAE resin was added at a concentration of about 1.81 kg per 907.2 kg of dried paper product. After about 60 seconds, a cationic SMI resin (MW of about 80,000) was added at a concentration of about 3.63 kg per 907.2 kg of dried paper product to the mixture. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 117 J/m and a wet tensile strength of about 16.5 J/m.

Example 6—Forming a Wet Strengthened Fiber Product (Wet Strengthening Agent: 16.7% PAE Resin and 83.3% Cationic SMI Resin)

The bleached furnish (about 60% hardwood and about 40% softwood) was diluted with water to a solids content of about 0.86% and had a CSF of 465. The pH was adjusted to about 7 and a PAE resin was added at a concentration of about 0.91 kg per 907.2 kg of dried paper product. After about 60 seconds, a cationic SMI resin (MW of about 80,000) was added at a concentration of about 4.54 kg per 907.2 kg of dried paper product to the mixture. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 98.8 J/m and a wet tensile strength of about 12 J/m.

Example 7—Forming a Wet Strengthened Fiber Product (Wet Strengthening Resin: 0% PAE Resin and 100% Cationic SMI Resin)

The bleached furnish (about 60% hardwood and about 40% softwood) was diluted with water to a solids content of about 0.86% and had a CSF of 465. The pH was adjusted to about 7 and a cationic SMI resin (MW of about 80,000) was added at a concentration of about 5.44 kg per 907.2 kg of dried paper product. The wet strengthening resin was added to individual sheets with no white water recycling within each run. The paper product was made on the Noble & Wood sheet former, pressed once at about 1,034 Torr between two blotters and dried on the Adirondack dryer with one pass at about 116° C. The sheets were cured at about 105° C. for about 5 min. The paper product with a basis weight of about 69 g/m² was tested to have a dry tensile strength of about 99.6 J/m and a wet tensile strength of about 7.1 J/m.

TABLE 1

Synergetic effect for blends of PAE and cationic SMI in Examples 1-7.

| Ex. | PAE (wt %) | SMI (wt %) | PAE/SMI Ratio | Expected Wet Tensile (J/m) | Measured Wet Tensile (J/m) | Measured Dry Tensile (J/m) | Wet/Dry Tensile Ratio (%) |
|---|---|---|---|---|---|---|---|
| 1 | 100.0 | 0 | — | — | 23.1 | 120.5 | 19.2 |
| 2 | 83.3 | 16.7 | 5 | 20.6 | 24.9 | 113.9 | 21.9 |

TABLE 1-continued

Synergetic effect for blends of PAE and cationic SMI in Examples 1-7.

| Ex. | PAE (wt %) | SMI (wt %) | PAE/SMI Ratio | Expected Wet Tensile (J/m) | Measured Wet Tensile (J/m) | Measured Dry Tensile (J/m) | Wet/Dry Tensile Ratio (%) |
|---|---|---|---|---|---|---|---|
| 3 | 66.7 | 33.3 | 2 | 17.9 | 21.4 | 109.4 | 19.6 |
| 4 | 50.0 | 50.0 | 1 | 15.3 | 19.6 | 120.5 | 16.3 |
| 5 | 33.3 | 66.7 | 0.5 | 12.5 | 16.5 | 117.0 | 14.1 |
| 6 | 16.7 | 83.3 | 0.2 | 9.9 | 12.0 | 98.8 | 12.1 |
| 7 | 0 | 100.0 | — | — | 7.1 | 99.6 | 7.1 |

The wet strengthened fiber product containing the wet strengthening resin of the PAE resin and the cationic SMI resin (Examples 2-6) has improved wet and dry tensile strength over using either the PAE resin alone (Example 1) or the cationic SMI resin alone (Example 7), without the other, as a wet strengthening agent.

Table 1 lists both the weight concentrations of the PAE resin within the wet strengthening resin and the weight concentrations of the cationic SMI resin within the wet strengthening resin for Examples 1-7. In Examples 1-7, 907.2 kg of the dried wet strengthened fiber product, once dried and cured, contains about 5.44 kg of the cationic SMI resin.

The expected wet tensile strength values were calculated for the wet strengthened fiber product containing the wet strengthening resin under the premise that no synergistic effect was provided by combining the PAE resin and the cationic SMI resin. Table 1 lists the expected wet tensile strength values, which are about 20.6 J/m, about 17.9 J/m, about 15.3 J/m, about 12.5 J/m, and about 9.9 J/m for Examples 2-6, respectively. Table 1 also lists the actual or measured wet tensile values for the wet strengthened fiber product containing the wet strengthening resin, generally of about 4.4 J/m to about 35.6 J/m. Examples 1-7 had a wet tensile value of about 23.1 J/m, about 24.9 J/m, about 21.4 J/m, about 19.6 J/m, about 16.5 J/m, about 12 J/m, and about 7.1 J/m, respectively. Table 1 also lists the actual or measured dry tensile strength values for the wet strengthened fiber product containing the wet strengthening resin, generally of about 89 J/m to about 133.4 J/m. Examples 1-7 had a dry tensile strength of about 120.5 J/m, about 113.9 J/m, about 109.4 J/m, about 120.5 J/m, about 117 J/m, about 98.8 J/m, and about 99.6 J/m, respectively. Therefore, combining the PAE resin and the cationic SMI resin provided a synergistic effect that produced wet strengthened fiber products that had surprisingly and unexpectedly improved wet tensile strengths. Examples 2-6 had measured wet tensile strength values that were about 21%, about 20%, about 28%, about 32%, and about 21%, respectively, greater than the expected wet tensile strengths for the combined PAE and cationic SMI resin.

Therefore, the wet strengthened fiber product can have a wet-to-dry (W/D) tensile strength ratio of about 5 to about 30, about 7 to about 25, or about 10 to about 20, such as, for example, about 10, about 11, about 12, about 13, about 14, about 15, about 16, about 17, about 18, about 19, about 20. In several specific examples, as listed in the far right column of Table 1, the W/D tensile strength ratio increases as the PAE resin to the cationic SMI resin (PAE/SMI) weight ratio increases, such as, for example, a W/D tensile strength ratio of 12.01 for a PAE/SMI ratio of 0.2, a W/D tensile strength ratio of 13.93 for a PAE/SMI ratio of 0.5, a W/D tensile strength ratio of 16.07 for a PAE/SMI ratio of 1.0, a W/D tensile strength ratio of 19.53 for a PAE/SMI ratio of 2, and a W/D tensile strength ratio of 21.92 for a PAE/SMI ratio of 5.0.

Embodiments of the present disclosure further relate to any one or more of the following paragraphs:

1. A wet strengthened fiber product, comprising: a fiber web; and an at least partially cured wet strengthening resin, wherein, prior to at least partially curing, the wet strengthening resin comprises: a polyamide-epihalohydrin (PAE) resin comprising the reaction product of a polyamidoamine and an epihalohydrin; and a cationic styrene maleimide (SMI) comprising the reaction product of a styrene maleic anhydride copolymer and an amine compound, a weight average molecular weight of about 500 to about 200,000, and a styrene to maleimide molar ratio of about 1:1 to about 5:1; wherein the PAE resin is present in the wet strengthening resin in an amount of about 5 wt % to about 95 wt % or about 10 wt % to about 90 wt %, based on the combined weight of the PAE resin and the cationic SMI resin; wherein the cationic SMI resin is present in the wet strengthening resin in an amount of about 5 wt % to about 95 wt % or about 10 wt % to about 90 wt %, based on the combined weight of the PAE resin and the cationic SMI resin; and wherein the wet strengthening resin is present in the wet strengthened fiber product in an amount of about 0.05 wt % to about 5 wt %, based on a combined weight of the PAE resin and the cationic SMI resin relative to a dried weight of the wet strengthened fiber product.

2. A wet strengthening resin, comprising: (A) wherein the wet strengthening resin is an uncured wet strengthening resin and comprises: a PAE resin comprising the reaction product of a polyamidoamine and an epihalohydrin, wherein the PAE resin is present in the wet strengthening resin in an amount of about 5 wt % to about 50 wt %; and a cationic SMI resin comprising the reaction product of a styrene maleic anhydride copolymer and an amine compound, wherein the cationic SMI resin has a weight average molecular weight of about 500 to about 200,000, wherein the cationic SMI resin has a styrene to maleimide molar ratio of about 1:1 to about 5:1, and wherein the cationic SMI resin is present in the wet strengthening resin in an amount of about 50 wt % to about 95 wt %; (B) wherein the wet strengthening resin is a cured wet strengthening resin, wherein, prior to curing, the wet strengthening resin comprises: a PAE resin comprising the reaction product of a polyamidoamine and an epihalohydrin, wherein the PAE resin is present in the wet strengthening resin in an amount of about 5 wt % to about 50 wt %; and a cationic SMI resin comprising the reaction product of a styrene maleic anhydride copolymer and an amine compound, wherein the cationic SMI resin has a weight average molecular weight of about 500 to about 200,000, wherein the cationic SMI resin has a styrene to maleimide molar ratio of about 1:1 to about 5:1, and wherein the cationic SMI resin is present in the wet strengthening resin in an amount of about 50 wt % to about 95 wt %; (C) wherein the wet strengthening resin is an uncured wet strengthening resin and comprises: a PAE resin comprising the reaction product of a polyamidoamine and an epihalohydrin, wherein the PAE resin is present in the wet strengthening resin in an amount of about 50 wt % to about 95 wt %; and a cationic SMI resin comprising the reaction product of a styrene maleic anhydride copolymer and an amine compound, wherein the cationic SMI resin has a weight average molecular weight of about 500 to about 200,000, wherein the cationic SMI resin has a styrene to maleimide molar ratio of about 1:1 to about 5:1, and wherein the cationic SMI resin is present in the wet strengthening resin in an amount of about 5 wt % to about 50 wt %; or (D) wherein the wet strengthening resin is a cured wet strengthening resin, wherein, prior to curing, the wet strengthening resin comprises: a PAE resin comprising the reaction product of a polyamidoamine and an epihalohydrin, wherein the PAE resin is present in the wet strengthening resin in an amount of about 50 wt % to about 95 wt %; and a cationic SMI resin comprising the reaction product of a styrene maleic anhydride copolymer and an amine compound, wherein the cationic SMI resin has a weight average molecular weight of about 500 to about 200,000, wherein the cationic SMI resin has a styrene to maleimide molar ratio of about 1:1 to about 5:1, and wherein the cationic SMI resin is present in the wet strengthening resin in an amount of about 5 wt % to about 50 wt %.

3. A method for forming wet strengthened fiber products, comprising: combining a wet strengthening resin with a plurality of fibers to produce a fiber mixture, wherein the wet strengthening resin comprises a PAE resin and a cationic SMI resin, wherein the PAE resin comprises a reaction product of a polyamidoamine and an epihalohydrin, and wherein the cationic SMI resin comprises: a reaction product of a styrene maleic anhydride copolymer and an amine compound; a weight average molecular weight of about 500 to about 200,000; and a styrene to maleimide molar ratio of about 1:1 to about 5:1; forming fiber sheets from the fiber mixture, wherein the fiber sheets comprise the fibers, the PAE resin, and the cationic SMI resin; and at least partially curing the PAE resin and the cationic SMI resin in the fiber sheets to form the wet strengthened fiber product.

4. A method for forming wet strengthened fiber products, comprising: adding a PAE resin to an aqueous suspension comprising fibers, wherein the PAE resin comprises a reaction product of a polyamidoamine and an epihalohydrin; and adding a cationic SMI resin to the aqueous suspension comprising the fibers and the PAE resin to form a fiber mixture comprising the fibers, the PAE resin, and the cationic SMI resin, wherein the cationic SMI resin comprises: a reaction product of a styrene maleic anhydride copolymer and an amine compound; a weight average molecular weight of about 500 to about 200,000; and a styrene to maleimide molar ratio of about 1:1 to about 5:1; forming fiber sheets from the fiber mixture, wherein the fiber sheets comprise the fibers, the PAE resin, and the cationic SMI resin; and at least partially curing the PAE resin and the cationic SMI resin in the fiber sheets to form the wet strengthened fiber products.

5. The wet strengthened fiber product or the method of any one of paragraphs 1, 3, or 4, wherein the wet strengthened fiber product has a dry tensile strength of about 89 J/m to about 133.4 J/m.

6. The wet strengthened fiber product or the method of any one of paragraphs 1, 3, or 4, wherein the wet strengthened fiber product has a wet tensile strength of about 4.4 J/m to about 26.7 J/m.

7. The wet strengthened fiber product or the method of any one of paragraphs 1, 3, or 4, wherein the wet strengthened fiber product has a wet-to-dry (W/D) tensile strength ratio of about 5 to about 30.

8. The wet strengthened fiber product or the method of any one of paragraphs 1, 3, or 4, wherein the wet strengthened fiber product has a basis weight of about 48.9 $g/m^2$ to about 97.7 $g/m^2$.

9. The wet strengthened fiber product, the wet strengthening resin, or the method of any one of paragraphs 1 to 4, wherein the styrene to maleimide molar ratio is about 1:1 to about 3:1.

10. The wet strengthened fiber product, the wet strengthening resin, or the method of any one of paragraphs 1 to 4, wherein the weight average molecular weight of the cationic SMI resin is about 2,000 to about 80,000.

11. The wet strengthened fiber product, the wet strengthening resin, or the method of any one of paragraphs 1 to 4, wherein the cationic SMI resin is present in the wet strengthening resin in an amount of about 10 wt % to about 50 wt %, based on the combined weight of the PAE resin and the cationic SMI resin.

12. The wet strengthened fiber product, the wet strengthening resin, or the method of any one of paragraphs 1 to 4, wherein the PAE resin is present in the wet strengthening resin in an amount of about 50 wt % to about 90 wt %, based on the combined weight of the PAE resin and the cationic SMI resin.

13. The wet strengthened fiber product, the wet strengthening resin, or the method of any one of paragraphs 1 to 4, wherein the cationic SMI resin is present in the wet strengthening resin in an amount of about 8 wt % to about 40 wt %, based on the combined weight of the PAE resin and the cationic SMI resin and wherein the PAE resin is present in the wet strengthening resin in an amount of about 60 wt % to about 92 wt %, based on the combined weight of the PAE resin and the cationic SMI resin.

14. The wet strengthened fiber product or the method of any one of paragraphs 1, 3, or 4, wherein the wet strengthening resin is present in the wet strengthened fiber product in an amount of about 0.1 wt % to about 2 wt %, based on a combined weight of the PAE resin and the cationic SMI resin relative to a dried weight of the wet strengthened fiber product.

15. The wet strengthened fiber product or the method of paragraph 14, wherein a weight ratio of the PAE resin and the cationic SMI resin in the wet strengthened fiber product is about 0.5 to about 5.

16. The wet strengthened fiber product or the method of any one of paragraphs 1, 3, or 4, wherein the wet strengthening resin is present in the wet strengthened fiber product in an amount of about 0.91 kg to about 22.7 kg, per 907.2 kg of the dried wet strengthened fiber product.

17. The wet strengthened fiber product, the wet strengthening resin, or the method of any one of paragraphs 1 to 4, wherein the cationic SMI resin comprises copolymers of styrene and dimethylaminopropylamine (DMAPA) maleimide acetate.

18. The wet strengthened fiber product, the wet strengthening resin, or the method of any one of paragraphs 1 to 4, wherein the cationic SMI resin has the chemical formula (A), wherein: $R^+$ is a cationic molecular group; $A^-$ is an anion; m is an integer of 1 to about 5; and n is an integer of about 5 to about 800.

19. The wet strengthened fiber product, the wet strengthening resin, or the method of paragraph 18, wherein the cationic molecular group is a cationic ammonium group or other cationic nitrogen-containing groups, a cationic phosphonium group or other cationic phosphorous-containing groups, or any mixture thereof.

20. The wet strengthened fiber product, the wet strengthening resin, or the method of paragraph 19, wherein the cationic molecular group is a cationic ammonium group.

21. The wet strengthened fiber product, the wet strengthening resin, or the method of paragraph 18, wherein the anion is a carboxylate, a halide, a phosphate, a sulfate, a borate, or any mixture thereof.

22. The wet strengthened fiber product, the wet strengthening resin, or the method of paragraph 21, wherein the anion is a carboxylate, and the carboxylate is an acetate anion, a citrate anion, an oxalate anion, a lactate anion, a formate anion, or any mixture thereof.

23. The wet strengthened fiber product, the wet strengthening resin, or the method of paragraph 18, wherein m is equal to 1 and n is an integer of about 5 to about 100.

24. The wet strengthened fiber product, the wet strengthening resin, or the method of paragraph 18, wherein m is equal to 3 and n is an integer of about 50 to about 300.

25. The wet strengthened fiber product, the wet strengthening resin, or the method of any one of paragraphs 1 to 4, wherein the cationic SMI resin has the chemical formula (B), wherein: $R^1$ is a substituted or unsubstituted organic diyl group; $R^2$, $R^3$, and $R^4$ are each independently selected from a hydrogen or a substituted or unsubstituted linear, branched, cyclic, heterocyclic, or aromatic hydrocarbyl group; $A^-$ is an anion; m is an integer of 1 to about 5; and n is an integer of about 5 to about 800.

26. The wet strengthened fiber product, the wet strengthening resin, or the method of paragraph 25, wherein $R^1$ is selected from the group consisting of: methanediyl, ethanediyl, propanediyl, butanediyl, pentanediyl, and any mixture thereof.

27. The wet strengthened fiber product, the wet strengthening resin, or the method of paragraph 26, wherein $R^1$ comprises propanediyl.

28. The wet strengthened fiber product, the wet strengthening resin, or the method of paragraph 25, wherein the substituted or unsubstituted linear, branched, cyclic, heterocyclic, or aromatic hydrocarbyl is selected from the group consisting of: alkyl, alkenyl, alkynyl, phenyl, aryl, alkanol, alkoxyl, amino, isomers thereof, and derivatives thereof.

29. The wet strengthened fiber product, the wet strengthening resin, or the method of paragraph 25, wherein $R^2$, $R^3$, and $R^4$ are each independently selected from the group consisting of: hydrogen, methyl, ethyl, propyl, butyl, pentyl, isomers thereof, and derivatives thereof.

30. The wet strengthened fiber product, the wet strengthening resin, or the method of any one of paragraphs 1 to 4, wherein the cationic SMI resin has the chemical formulas (C), (D), or (E), wherein: $A^-$ is an anion; and $n^1$, $n^2$, and $n^3$ are each independently of about 5 to about 800.

31. The wet strengthened fiber product, the wet strengthening resin, or the method of paragraph 30, wherein the anion is a carboxylate, a halide, a phosphate, a sulfate, a borate, or any mixture thereof.

32. The wet strengthened fiber product, the wet strengthening resin, or the method of paragraph 31, wherein the anion is a carboxylate, and the carboxylate is an acetate anion, a citrate anion, or any mixture thereof.

33. The wet strengthened fiber product, the wet strengthening resin, or the method of paragraph 32, wherein $n^1$ is about 5 to about 100, $n^2$ is about 20 to about 200, and $n^3$ is about 50 to about 300.

34. The wet strengthened fiber product, the wet strengthening resin, or the method of any one of paragraphs 1 to 4, wherein the cationic SMI resin has the chemical formulas (F), (G), or (H), wherein $n^1$, $n^2$, and $n^3$ are each independently of about 5 to about 800.

35. The wet strengthened fiber product, the wet strengthening resin, or the method of paragraph 34, wherein $n^1$ is about 5 to about 100, $n^2$ is about 20 to about 200, and $n^3$ is about 50 to about 300.

36. The wet strengthened fiber product, the wet strengthening resin, or the method of any one of paragraphs 1 to 4, wherein the PAE resin is a reaction product of a polyamidoamine and an epihalohydrin, and wherein the polyamidoamine is a reaction product of a polyamine and a dicarboxylic acid.

37. The wet strengthened fiber product, the wet strengthening resin, or the method of paragraph 36, wherein the polyamidoamine is in a concentration of about 0.56 moles to about 1.35 moles, the epihalohydrin is in a concentration of about 0.75 moles to about 1.8 moles, the polyamine is in a concentration of about 0.9 moles to about 1.1 moles, and the dicarboxylic acid is in a concentration of about 0.9 moles to about 1.1 moles.

38. The wet strengthened fiber product, the wet strengthening resin, or the method of paragraph 36, wherein the polyamine comprises dimethylenetriamine, diethylenetriamine, triethylenetetramine, tripropylenetetramine, tetraethylenepentamine, pentaethylenehexamine, or any mixture thereof.

39. The wet strengthened fiber product, the wet strengthening resin, or the method of paragraph 38, wherein the dicarboxylic acid is selected from the group consisting of: glutaric acid, adipic acid, azelaic acid, malonic acid, suberic acid, sebacic acid, succinic acid, oxalic acid, pimelic acid, and any mixture thereof.

40. The wet strengthened fiber product, the wet strengthening resin, or the method of paragraph 36, wherein the epihalohydrin is selected from the group consisting of: epichlorohydrin, epibromohydrin, epifluorohydrin, epiiodohydrin, and any mixture thereof.

41. The wet strengthened fiber product, the wet strengthening resin, or the method of any one of paragraphs 1 to 4, wherein the PAE resin has a weight average molecular weight of about 20,000 to about 3,000,000.

42. The wet strengthened fiber product, the wet strengthening resin, or the method of any one of paragraphs 1 to 4, wherein the PAE resin has an azetidinium ion ratio of about 0.55 to about 0.80.

43. The wet strengthened fiber product or the method of any one of paragraphs 1, 3, or 4, wherein the PAE resin has a charge density of about 1.5 mEq/g to about 3.0 mEq/g of solids.

44. The wet strengthened fiber product or the method of any one of paragraphs 1, 3, or 4, wherein the fiber web is a cellulosic fiber web comprising at least one material selected from the group consisting of: bleached furnish, softwood, hardwood, paper pulp, mechanical pulp, and any mixture thereof.

45. The wet strengthened fiber product, the wet strengthening resin, or the method of any one of paragraphs 1 to 4, wherein the styrene to maleimide molar ratio is about 1:1 to about 3:1.

46. The wet strengthened fiber product, the wet strengthening resin, or the method of any one of paragraphs 1 to 4, wherein the weight average molecular weight of the cationic SMI resin is about 2,000 to about 80,000.

47. The wet strengthened fiber product, the wet strengthening resin, or the method of any one of paragraphs 1 to 4, wherein the cationic SMI resin comprises copolymers of styrene and dimethylaminopropylamine maleimide.

48. The wet strengthened fiber product, the wet strengthening resin, or the method of paragraph 47, wherein the dimethylaminopropylamine maleimide is an acetate.

49. The method of paragraph 3 or 4, further comprising: adding the PAE resin to an aqueous suspension comprising the fibers; and adding the cationic SMI resin to the aqueous suspension comprising the fibers and the PAE resin to form the fiber mixture comprising the fibers, the PAE resin, and the cationic SMI resin.

50. The method of paragraph 49, wherein the aqueous suspension is adjusted to a pH value of about 6.0 to about 8.0 prior to adding the PAE resin.

51. The method of paragraph 49, wherein the cationic SMI resin is added to the aqueous suspension at a time period of about 20 seconds to about 5 minutes after the PAE resin is added to the aqueous suspension.

52. The method of paragraph 3 or 4, further comprising: adding the cationic SMI resin to an aqueous suspension comprising the fibers; and adding the PAE resin to the aqueous suspension comprising the fibers and the cationic SMI resin to form the fiber mixture comprising the fibers, the PAE resin, and the cationic SMI resin.

53. The method of paragraph 3 or 4, wherein forming the fiber sheets further comprises: passing the fiber mixture through a sheet former to form the fiber sheets; applying pressure to the fiber sheets; and drying the fiber sheets.

54. The method of paragraph 53, wherein applying pressure to the fiber sheets includes applying pressure to the fiber sheets with at least one blotter, wherein the pressure is about 259 Torr to about 2,586 Torr.

55. The method of paragraph 54, wherein applying pressure to the fiber sheets includes pressing the fiber sheets between two blotters at a pressure of about 517 Torr to about 1,551 Torr.

56. The method of paragraph 53, wherein drying the fiber sheets includes heating the fiber sheets at a drying temperature of about 110° C. to about 150° C. with a sheet dryer.

57. The method of paragraph 3 or 4, wherein at least partially curing the PAE resin and the cationic SMI resin in the fiber sheets includes heating the fiber sheets at a curing temperature of about 90° C. to about 115° C. for a time period of about 3 minutes to about 10 minutes.

58. The method of paragraph 3 or 4, wherein at least partially curing the PAE resin and the cationic SMI resin in the fiber sheets includes forming an at least partially cured wet strengthening resin, wherein, prior to at least partially curing, the wet strengthening resin comprises the PAE resin and the cationic SMI resin.

59. The method of paragraph 58, wherein the wet strengthening resin is present in the wet strengthened fiber product in an amount of about 0.05 wt % to about 5 wt %, based on a combined weight of the PAE resin and the cationic SMI resin relative to a dried weight of the wet strengthened fiber product.

60. The method of paragraph 3 or 4, wherein the PAE resin is present in the wet strengthening resin in an amount of about 50 wt % to about 95 wt %, based on the combined weight of the PAE resin and the cationic SMI resin.

61. The method of paragraph 3 or 4, wherein the cationic SMI resin is present in the wet strengthening resin in an amount of about 5 wt % to about 50 wt %, based on the combined weight of the PAE resin and the cationic SMI resin.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. And if applicable, all patents, test procedures, and other documents cited in this application are fully incorporated by reference to the extent such disclosure is not inconsistent with this application and for all jurisdictions in which such incorporation is permitted.

While the foregoing is directed to certain illustrative embodiments, other and further embodiments of the invention can be devised without departing from the basic scope thereof, and the scope thereof is determined by the claims that follow.

What is claimed is:

1. A wet strengthening resin, comprising:
a polyamide-epihalohydrin resin comprising a reaction product of a polyamidoamine and an epihalohydrin; and
a cationic styrene maleimide resin comprising a reaction product of a styrene maleic anhydride copolymer and an amine compound, a weight average molecular weight of about 500 to about 200,000, and a styrene to maleimide molar ratio of about 1:1 to about 5:1, wherein the wet strengthening resin comprises about 16.7 wt % to about 83.3 wt % of the cationic styrene maleimide resin, based on a combined weight of the polyamide-epihalohydrin resin and the cationic styrene maleimide resin.

2. The wet strengthening resin of claim 1, wherein the cationic styrene maleimide resin has the chemical formula:

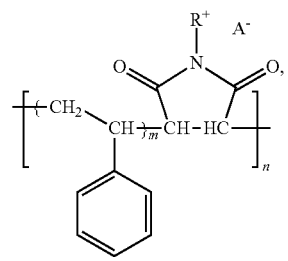

wherein:
R+ is a cationic molecular group;
A− is an anion;
m is an integer of 1 to about 5; and
n is an integer of about 5 to about 800.

3. The wet strengthening resin of claim 2, wherein the cationic molecular group is a cationic ammonium group, wherein the anion is a carboxylate, and the carboxylate is an acetate anion, a citrate anion, oxalate anion, a lactate anion, a formate anion, or a mixture thereof.

4. The wet strengthening resin of claim 3, wherein m is equal to 1 and n is an integer of about 5 to about 100.

5. The wet strengthening resin of claim 3, wherein m is equal to 3 and n is an integer of about 50 to about 300.

6. The wet strengthening resin of claim 1, wherein the cationic styrene maleimide resin has the chemical formula:

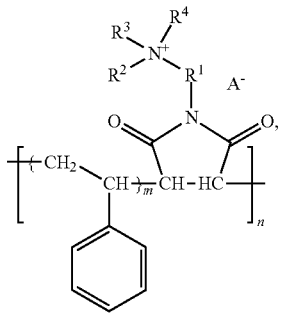

wherein:
$R^1$ is a substituted or unsubstituted organic diyl group;
$R^2$, $R^3$, and $R^4$ are each independently selected from a hydrogen or a substituted or unsubstituted linear, branched, cyclic, heterocyclic, or aromatic hydrocarbyl group;
A− is an anion;
m is an integer of 1 to about 5; and
n is an integer of about 5 to about 800.

7. The wet strengthening resin of claim 6, wherein $R^1$ is selected from the group consisting of: methanediyl, ethanediyl, propanediyl, butanediyl, pentanediyl, and a mixture thereof, wherein $R^2$, $R^3$, and $R^4$ are each independently selected from the group consisting of: hydrogen, methyl, ethyl, propyl, butyl, and pentyl.

8. The wet strengthening resin of claim 1, wherein the cationic styrene maleimide resin has the chemical formula:

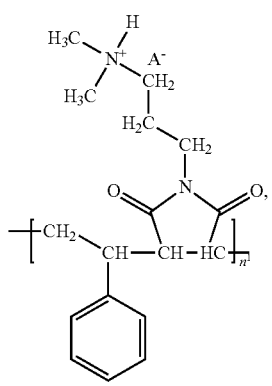

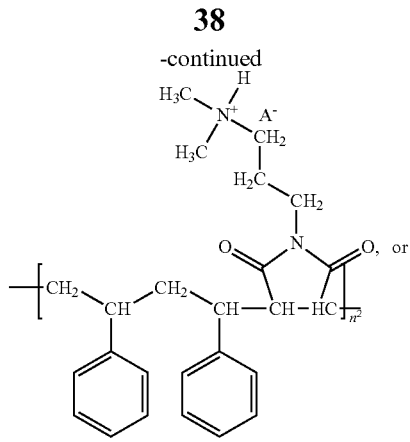

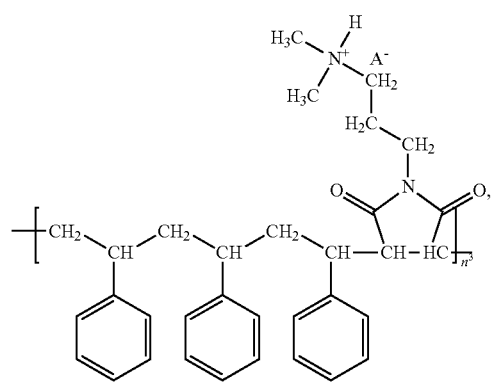

wherein:
A− is an anion; and
$n^1$, $n^2$, and $n^3$ are each independently of about 5 to about 800.

9. The wet strengthening resin of claim 8, wherein the anion is a carboxylate, wherein $n^1$ is about 5 to about 100, $n^2$ is about 20 to about 200, and $n^3$ is about 50 to about 300.

10. The wet strengthening resin of claim 1, wherein the cationic styrene maleimide resin has the chemical formula:

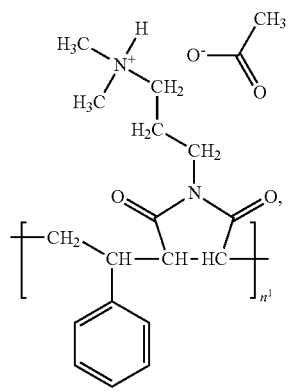

-continued

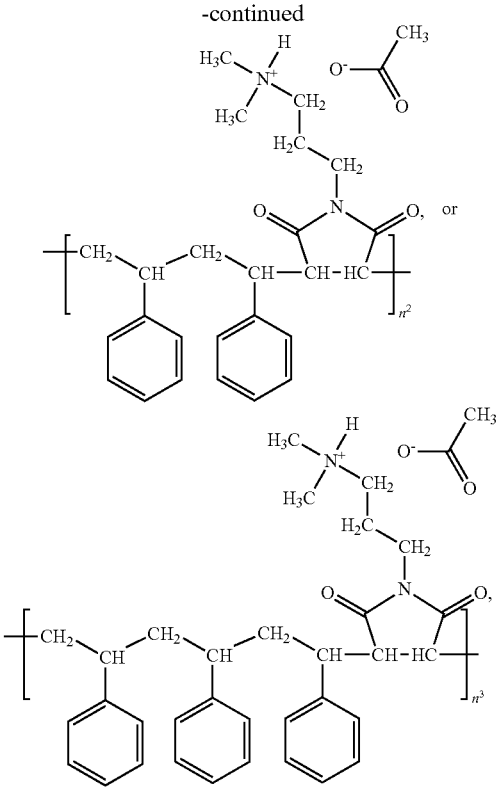

wherein $n^1$ is about 5 to about 100, $n^2$ is about 20 to about 200, and $n^3$ is about 50 to about 300.

11. The wet strengthening resin of claim 1, wherein the cationic styrene maleimide resin comprises a copolymer of styrene and dimethylaminopropylamine maleimide acetate.

12. The wet strengthening resin of claim 1, wherein the polyamide-epihalohydrin resin has a weight average molecular weight of about 20,000 to about 3,000,000, an azetidinium ion ratio of about 0.55 to about 0.80, and a charge density of about 1.5 mEq/g to about 3.0 mEq/g of solids.

13. A process for making a wet strengthening resin, comprising:
combining a polyamide-epihalohydrin resin and a cationic styrene maleimide resin to produce a wet strengthening resin, wherein:
the polyamide-epihalohydrin resin comprises a reaction product of a polyamidoamine and an epihalohydrin,
the cationic styrene maleimide resin comprises a reaction product of a styrene maleic anhydride copolymer and an amine compound, a weight average molecular weight of about 500 to about 200,000, and a styrene to maleimide molar ratio of about 1:1 to about 5:1, and
the wet strengthening resin comprises about 16.7 wt % to about 83.3 wt % of the cationic styrene maleimide resin, based on the combined weight of the polyamide-epihalohydrin resin and the cationic styrene maleimide resin.

14. The process of claim 13, wherein the polyamide-epihalohydrin resin has a weight average molecular weight of about 20,000 to about 3,000,000, an azetidinium ion ratio of about 0.55 to about 0.80, and a charge density of about 1.5 mEq/g to about 3.0 mEq/g of solids.

15. The process of claim 13, wherein the cationic styrene maleimide resin comprises copolymers of styrene and dimethylaminopropylamine maleimide acetate.

16. The process of claim 13, wherein the polyamide-epihalohydrin resin has a weight average molecular weight of about 20,000 to about 3,000,000, an azetidinium ion ratio of about 0.55 to about 0.80, and a charge density of about 1.5 mEq/g to about 3.0 mEq/g of solids, and wherein the cationic styrene maleimide resin comprises a copolymer of styrene and dimethylaminopropylamine maleimide acetate.

17. A fiber mixture, comprising:
a plurality of fibers; and
a wet strengthening resin, comprising:
a polyamide-epihalohydrin resin comprising a reaction product of a polyamidoamine and an epihalohydrin; and
a cationic styrene maleimide resin comprising a reaction product of a styrene maleic anhydride copolymer and an amine compound, a weight average molecular weight of about 500 to about 200,000, and a styrene to maleimide molar ratio of about 1:1 to about 5:1, wherein the wet strengthening resin comprises about 16.7 wt % to about 83.3 wt % of the cationic styrene maleimide resin, based on a combined weight of the polyamide-epihalohydrin resin and the cationic styrene maleimide resin.

18. The fiber mixture of claim 17, wherein the plurality of fibers comprises cellulosic fibers.

19. The fiber mixture of claim 18, wherein the polyamide-epihalohydrin resin has a weight average molecular weight of about 20,000 to about 3,000,000, an azetidinium ion ratio of about 0.55 to about 0.80, and a charge density of about 1.5 mEq/g to about 3.0 mEq/g of solids.

20. The fiber mixture of claim 19, wherein the cationic styrene maleimide resin comprises copolymers of styrene and dimethylaminopropylamine maleimide acetate.

* * * * *